US009590243B2

(12) United States Patent
Park et al.

(10) Patent No.: US 9,590,243 B2
(45) Date of Patent: *Mar. 7, 2017

(54) MATERIAL FOR LITHIUM SECONDARY BATTERY OF HIGH PERFORMANCE

(71) Applicant: LG Chem, Ltd., Seoul (KR)

(72) Inventors: Hong-Kyu Park, Daejeon (KR); Sun sik Shin, Daejeon (KR); Sin young Park, Daejeon (KR); Ho suk Shin, Daejeon (KR); Jens M. Paulsen, Chungcheongnam-do (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/307,782

(22) Filed: Jun. 18, 2014

(65) Prior Publication Data

US 2014/0302615 A1  Oct. 9, 2014

Related U.S. Application Data

(63) Continuation of application No. 13/870,602, filed on Apr. 25, 2013, now Pat. No. 8,795,897, which is a continuation of application No. 12/893,176, filed on Sep. 29, 2010, now Pat. No. 8,450,013, which is a continuation of application No. 11/831,516, filed on Jul. 31, 2007, now abandoned, which is a continuation-in-part of application No. 11/104,734, filed on Apr. 13, 2005, now Pat. No. 7,648,693.

(51) Int. Cl.
| | |
|---|---|
| *C01G 53/00* | (2006.01) |
| *H01M 4/485* | (2010.01) |
| *H01M 4/505* | (2010.01) |
| *H01M 4/525* | (2010.01) |
| *C01G 45/12* | (2006.01) |
| *C01G 51/00* | (2006.01) |
| *H01M 10/052* | (2010.01) |

(52) U.S. Cl.
CPC ........ *H01M 4/485* (2013.01); *C01G 45/1228* (2013.01); *C01G 51/50* (2013.01); *C01G 53/006* (2013.01); *C01G 53/50* (2013.01); *H01M 4/505* (2013.01); *H01M 4/525* (2013.01); *C01P 2002/54* (2013.01); *C01P 2002/72* (2013.01); *C01P 2002/77* (2013.01); *C01P 2002/88* (2013.01); *C01P 2004/03* (2013.01); *C01P 2004/84* (2013.01); *C01P 2006/10* (2013.01); *C01P 2006/37* (2013.01); *C01P 2006/40* (2013.01); *C01P 2006/80* (2013.01); *H01M 10/052* (2013.01); *Y02E 60/122* (2013.01); *Y02P 70/54* (2015.11); *Y10T 436/15* (2015.01)

(58) Field of Classification Search
CPC ...... C01G 53/50; H01M 4/485; H01M 4/505; H01M 4/525
USPC .................. 429/223; 423/594.4; 252/519.15
See application file for complete search history.

(56) References Cited

U.S. PATENT DOCUMENTS

| | | | |
|---|---|---|---|
| 4,980,080 | A | 12/1990 | Lecerf et al. |
| 5,264,201 | A | 11/1993 | Dahn et al. |
| 5,370,948 | A | 12/1994 | Hasegawa et al. |
| 5,393,622 | A | 2/1995 | Nitta et al. |
| 5,718,989 | A | 2/1998 | Aoki et al. |
| 5,795,558 | A | 8/1998 | Aoki et al. |
| 6,040,090 | A | 3/2000 | Sunagawa et al. |
| 6,393,622 | B1 | 5/2002 | Rice |
| 6,660,432 | B2 | 12/2003 | Paulsen et al. |
| 6,835,492 | B2 | 12/2004 | Cho et al. |
| 6,846,592 | B2 | 1/2005 | Kweon et al. |

(Continued)

FOREIGN PATENT DOCUMENTS

| | | |
|---|---|---|
| CN | 1322026 A | 11/2001 |
| CN | 1356737 A | 7/2002 |

(Continued)

OTHER PUBLICATIONS

Omanda, et al.; "Improvement of the Thermal Stability of LiNiO.8CoO.2O2 Cathode by a SiOx Protective Coating"; Journal of the Electrochemical Society; vol. 151, No. 6; pp. A922-A929; 2004.
Office Action from corresponding Chinese Application No. 200780002216 issued Nov. 6, 2009.
Hu Chen, Study on Synthesis and Property of Lithium Nickel Oxides as Cathode Material for Li-ion Batteries, Chinese Doctoral Dissertations & Master's Theses Full-Text Database, vol. 3, 2004.
Office Action from corresponding Chinese Application No. 200780002247.5 issued Jul. 31, 2009.
Office Action from corresponding Chinese Application No. 200780002247.5 issued Jul. 29, 2010.
Yao Chen et al, Journal of Power Sources, 119-121, 184-188, Dec. 31, 2003.

(Continued)

*Primary Examiner* — Steven Bos
(74) *Attorney, Agent, or Firm* — Lerner, David, Littenberg, Krumholz & Mentlik, LLP

(57) ABSTRACT

Provided is a cathode active material containing a Ni-based lithium mixed transition metal oxide. More specifically, the cathode active material comprises the lithium mixed transition metal oxide having a composition represented by Formula I of $Li_xM_yO_2$ wherein M, x and y are as defined in the specification, which is prepared by a solid-state reaction of $Li_2CO_3$ with a mixed transition metal precursor under an oxygen-deficient atmosphere, and has a $Li_2CO_3$ content of less than 0.07% by weight of the cathode active material as determined by pH titration. The cathode active material in accordance with the present invention and substantially free of water-soluble bases such as lithium carbonates and lithium sulfates and therefore has excellent high-temperature and storage stabilities and a stable crystal structure. A secondary battery comprising such a cathode active material exhibits a high capacity and excellent characteristics, and can be produced by an environmentally friendly method with low production costs and high production efficiency.

21 Claims, 10 Drawing Sheets

(56) References Cited

U.S. PATENT DOCUMENTS

| | | |
|---|---|---|
| 6,875,416 B1 | 4/2005 | Benz et al. |
| 6,893,776 B2 | 5/2005 | Naruoka et al. |
| 6,949,233 B2 | 9/2005 | Kweon et al. |
| 7,381,498 B2 | 6/2008 | Suhara et al. |
| 7,648,693 B2 | 1/2010 | Paulsen et al. |
| 7,935,443 B2 | 5/2011 | Ohzuku et al. |
| 7,943,111 B2 | 5/2011 | Paulsen et al. |
| 8,426,066 B2 | 4/2013 | Park et al. |
| 8,450,013 B2 | 5/2013 | Park et al. |
| 8,540,961 B2 | 9/2013 | Park et al. |
| 2002/0031703 A1 | 3/2002 | Kameyama et al. |
| 2002/0086210 A1 | 7/2002 | Naruoka et al. |
| 2003/0022063 A1 | 1/2003 | Paulsen et al. |
| 2003/0028519 A1 | 2/2003 | Burgess |
| 2003/0148182 A1 | 8/2003 | Park et al. |
| 2004/0091779 A1 | 5/2004 | Kang et al. |
| 2004/0161668 A1 | 8/2004 | Maeda et al. |
| 2005/0002855 A1 | 1/2005 | Fetcenko et al. |
| 2005/0058588 A1 | 3/2005 | Kang et al. |
| 2005/0089756 A1 | 4/2005 | Ito et al. |
| 2006/0121350 A1* | 6/2006 | Kajiya ............ C01B 13/185 429/223 |
| 2006/0233696 A1 | 10/2006 | Paulsen et al. |
| 2009/0224201 A1 | 9/2009 | Paulsen et al. |

FOREIGN PATENT DOCUMENTS

| | | | |
|---|---|---|---|
| CN | 1417876 A | | 5/2003 |
| CN | 1595680 A | | 3/2005 |
| CN | 1735986 A | | 2/2006 |
| EP | 1143549 | * | 10/2001 |
| EP | 1317008 | | 6/2003 |
| EP | 2016636 A1 | | 1/2009 |
| EP | 2016637 A1 | | 1/2009 |
| EP | 2016638 A1 | | 1/2009 |
| JP | 3281829 | | 12/1991 |
| JP | 3244314 | | 10/1992 |
| JP | 05062678 A | | 3/1993 |
| JP | 8213015 | | 8/1996 |
| JP | 10188982 | | 7/1998 |
| JP | 10199525 | | 7/1998 |
| JP | H11135118 A | | 5/1999 |
| JP | 11-283621 | | 10/1999 |
| JP | 11307094 | | 11/1999 |
| JP | 2000133262 A | | 5/2000 |
| JP | 2000353525 | | 12/2000 |
| JP | 2001106534 A | | 4/2001 |
| JP | 2001-273898 A | | 10/2001 |
| JP | 2002110167 A | | 4/2002 |
| JP | 2002145623 | | 5/2002 |
| JP | 2002358953 | | 12/2002 |
| JP | 2002373658 | | 12/2002 |
| JP | 2003-017054 | | 1/2003 |
| JP | 2003002660 A | | 1/2003 |
| JP | 2003034538 | | 2/2003 |
| JP | 2003081639 | | 3/2003 |
| JP | 2003089526 | | 3/2003 |
| JP | 2003297354 | | 10/2003 |
| JP | 2004006277 A | | 1/2004 |
| JP | 2004031091 | | 1/2004 |
| JP | 2004055539 | | 2/2004 |
| JP | 2004071518 | | 3/2004 |
| JP | 2004111076 | | 4/2004 |
| JP | 2004227915 A | | 8/2004 |
| JP | 2004-265806 | | 9/2004 |
| JP | 2004281253 | | 10/2004 |
| JP | 2005025975 | | 1/2005 |
| JP | 2005100947 A | | 4/2005 |
| JP | 2005150057 | | 6/2005 |
| JP | 2005197004 A | | 7/2005 |
| JP | 2005310744 | | 11/2005 |
| JP | 2005-340186 A | | 12/2005 |
| JP | 2006073253 A | | 3/2006 |
| JP | 2006107845 | | 4/2006 |
| JP | 2008270201 A | | 11/2008 |
| JP | 2009536436 A | | 10/2009 |
| JP | 2009536437 A | | 10/2009 |
| KR | 19980079270 A | | 11/1998 |
| KR | 20020036283 A | | 5/2002 |
| KR | 20050096191 A | | 10/2005 |
| KR | 20060009797 A | | 2/2006 |
| TW | 200501486 | | 1/2005 |
| WO | 99/40029 | | 8/1999 |
| WO | 00/23380 | | 4/2000 |
| WO | 03003487 A1 | | 1/2003 |
| WO | 2004064180 A1 | | 7/2004 |
| WO | 2005/020354 | | 3/2005 |
| WO | 2005112152 A1 | | 11/2005 |
| WO | 2006/136050 A1 | | 12/2006 |
| WO | 2007072759 A1 | | 6/2007 |
| WO | 2007129848 A1 | | 11/2007 |

OTHER PUBLICATIONS

Office Action from corresponding Chinese Application No. 200780002227.8 issued Oct. 30, 2009.

Office Action from corresponding Taiwanese Application No. 095116589 issued Sep. 12, 2009.

Notice of Rejection from corresponding Taiwanese Application No. 095116589 issued Aug. 3, 2010.

International Search Report, PCT/KR2007/002230, dated Aug. 16, 2007.

J. Katana Ngala. Natasha A. Chernova. Luis Matienzo. Peter Y. Zavalij and M. Stanley Whittingham: liThe Syntheses and Characterization of Layered LiNi1-y-zMnyCozO2 Compounds Mat. Res. Soc. Symp. Proc ., vol. 756.2003. pp. EE6.4.1-EE6.4.6. XP002560562.

J. Katana Ngala. Natasha A. Chernova.Miaomiao Ma. Marc Mamak.Peter Y. Zavalij and M. Stanley Whittingham: "The synthesis. characterization and electrochemical behavior of the layered LiNiO.4Mna4CoO.2O2 compound" J. . Ma T E R. C Hem ., vol. 14.2004. pp. 214-220. XP002560563.

Supplementary European Search Report, EP 07746385 dated Dec. 17, 2009.

Tran et al., Journal of the Electrochemical Society, 153 (2) A261-A269, published on Dec. 23, 2005.

Third Party Obervations according to Art. 115 EPC for European Appliction No. 07746385 (EP 2016636) dated May 11, 2009.

International Search Report, PCT/KR2007/002251, dated Aug. 16, 2007.

Supplementary European Search Report, EP 07746404 dated Dec. 17, 2009.

Third Party Obervations according to Art. 115 EPC for European Appliction No. 07746404 (EP 2016637) dated May 11, 2009.

International Search Report, PCT/KR2007/002267, dated Aug. 16, 2007.

Supplementary European Search Report, EP 07746420 dated Dec. 17, 2009.

Third Party Obervations according to Art. 115 EPC for European Appliction No. 07746420 (EP 2016638) dated May 11, 2009.

Third Party Observation for Application No. EP 07746420.4 dated Apr. 4, 2011.

Third Party Observation for Application No. EP 07746404.8 dated Apr. 20, 2012.

Third Party Observation for Application No. EP 07746404.8 dated Apr. 4, 2011.

European Examination Report for Application No. 07746420.4 dated Sep. 7, 2011.

European Examination Report for Application No. 07746404.8 dated Sep. 12, 2011.

European Examination Report for Application No. 07746385.9 dated Sep. 12, 2011.

Extended European Search Report for Application No. EP12158214.2 dated Mar. 29, 2012.

European Search Report for Application No. EP12158214.2 dated Mar. 21, 2012.

European Search Report for Application No. EP12158212.6 dated Mar. 21, 2012.

(56) References Cited

OTHER PUBLICATIONS

Extended European Search Report for Application No. EP07746404 dated Jan. 7, 2010.
Office Action from Chinese Application No. 200780002227.8, dated Sep. 17, 2015.

* cited by examiner

MATERIAL FOR LITHIUM SECONDARY BATTERY OF HIGH PERFORMANCE

FIELD OF THE INVENTION

The present invention relates to a cathode active material containing a Ni-based lithium mixed transition metal oxide. More specifically, the present invention relates to a cathode active material which comprises a lithium mixed transition metal oxide having a given composition, in which the lithium mixed transition metal oxide is prepared by a solid-state reaction of $Li_2CO_3$ with a mixed transition metal precursor under an oxygen-deficient atmosphere, and has a $Li_2CO_3$ content of less than 0.07% by weight of the cathode active material as determined by pH titration.

BACKGROUND OF THE INVENTION

Technological development and increased demand for mobile equipment have led to a rapid increase in the demand for secondary batteries as an energy source. Among other things, lithium secondary batteries having a high-energy density and voltage, a long cycle lifespan and a low self-discharge rate are commercially available and widely used.

As cathode active materials for the lithium secondary batteries, lithium-containing cobalt oxide ($LiCoO_2$) is largely used. In addition, consideration has been made to using lithium-containing manganese oxides such as $LiMnO_2$ having a layered crystal structure and $LiMn_2O_4$ having a spinel crystal structure, and lithium-containing nickel oxides ($LiNiO_2$).

Of the aforementioned cathode active materials, $LiCoO_2$ is currently widely used due to superior general properties including excellent cycle characteristics, but suffers from low safety, expensiveness due to finite resources of cobalt as a raw material, and limitations in practical and mass application thereof as a power source for electric vehicles (EVs) and the like.

Lithium manganese oxides, such as $LiMnO_2$ and $LiMn_2O_4$, are abundant resources as raw materials and advantageously employ environmentally-friendly manganese, and therefore have attracted a great deal of attention as a cathode active material capable of substituting $LiCoO_2$. However, these lithium manganese oxides suffer from shortcomings such as low capacity and poor cycle characteristics.

Whereas, lithium/nickel-based oxides including $LiNiO_2$ are inexpensive as compared to the aforementioned cobalt-based oxides and exhibit a high discharge capacity upon charging to 4.3 V. The reversible capacity of doped $LiNiO_2$ approximates about 200 mAh/g which exceeds the capacity of $LiCoO_2$ (about 165 mAh/g). Therefore, despite a slightly lower average discharge voltage and a slightly lower volumetric density, commercial batteries comprising $LiNiO_2$ as the cathode active material exhibit an improved energy density. To this end, a great deal of intensive research is being actively undertaken on the feasibility of applications of such nickel-based cathode active materials for the development of high-capacity batteries. However, the $LiNiO_2$-based cathode active materials suffer from some limitations in practical application thereof, due to the following problems.

First, $LiNiO_2$-based oxides undergo sharp phase transition of the crystal structure with volumetric changes accompanied by repeated charge/discharge cycling, and thereby may suffer from cracking of particles or formation of voids in grain boundaries. Consequently, intercalation/deintercalation of lithium ions may be hindered to increase the polarization resistance, thereby resulting in deterioration of the charge/discharge performance. In order to prevent such problems, conventional prior arts attempted to prepare a $LiNiO_2$-based oxide by adding an excess of a Li source and reacting reaction components under an oxygen atmosphere. However, the thus-prepared cathode active material, under the charged state, undergoes structural swelling and destabilization due to the repulsive force between oxygen atoms, and suffers from problems of severe deterioration in cycle characteristics due to repeated charge/discharge cycles.

Second, $LiNiO_2$ has shortcomings associated with the evolution of excess gas during storage or cycling. That is, in order to smoothly form the crystal structure, an excess of a Li source is added during manufacturing of the $LiNiO_2$-based oxide, followed by heat treatment. As a result, water-soluble bases including $Li_2CO_3$ and LiOH reaction residues remain between primary particles and thereby they decompose or react with electrolytes to thereby produce $CO_2$ gas, upon charging. Further, $LiNiO_2$ particles have an agglomerate secondary particle structure in which primary particles are agglomerated to form secondary particles and consequently a contact area with the electrolyte further increases to result in severe evolution of $CO_2$ gas, which in turn unfortunately leads to the occurrence of battery swelling and deterioration of desirable high-temperature safety.

Third, $LiNiO_2$ suffers from a sharp decrease in the chemical resistance of a surface thereof upon exposure to air and moisture, and the gelation of slurries by polymerization of an N-methyl pyrrolidone/poly(vinylidene fluoride) (NMP-PVDF) slurry due to a high pH value. These properties of $LiNiO_2$ cause severe processing problems during battery production.

Fourth, high-quality $LiNiO_2$ cannot be produced by a simple solid-state reaction as is used in the production of $LiCoO_2$, and $LiNiMO_2$ cathode active materials containing an essential dopant cobalt and further dopants manganese and aluminum are produced by reacting a lithium source such as $LiOH \cdot H_2O$ with a mixed transition metal hydroxide under an oxygen or syngas atmosphere (i.e., a $CO_2$-deficient atmosphere), which consequently increases production costs. Further, when an additional step, such as intermediary washing or coating, is included to remove impurities in the production of $LiNiO_2$, this leads to a further increase in production costs.

Many prior arts focus on improving properties of $LiNiO_2$-based cathode active materials and processes to prepare $LiNiO_2$. However, various problems, such as high production costs, swelling due to gas evolution in the fabricated batteries, poor chemical stability, high pH and the like, have not been sufficiently solved. A few examples will be illustrated hereinafter.

U.S. Pat. No. 6,040,090 (T. Sunagawa et al., Sanyo) discloses a wide range of compositions including nickel-based and high-Ni $LiMO_2$, the materials having high crystallinity and being used in Li-ion batteries in ethylene carbonate (EC) containing an electrolyte. Samples were prepared on a small scale, using $LiOH \cdot H_2O$ as a lithium source. The samples were prepared in a flow of synthetic air composed of a mixture of oxygen and nitrogen, free of $CO_2$.

U.S. Pat. No. 5,264,201 (J. R. Dahn et al.) discloses a doped $LiNiO_2$ substantially free of lithium hydroxides and lithium carbonates. For this purpose, lithium hydroxide and $LiOH \cdot H_2O$ as a lithium source are employed and heat treatment is performed under an oxygen atmosphere free of $CO_2$, additionally with a low content of $H_2O$. An excess of lithium "evaporates"; however, "evaporation" is a lab-scale effect and not an option for large-scale preparation. That is, when applied to a large-scale production process, it becomes difficult to evaporate excess lithium, thereby resulting in problems associated with the formation of lithium hydroxides and lithium carbonates.

U.S. Pat. No. 5,370,948 (M. Hasegawa et al., Matsushita) discloses a process for the production of Mn-doped $LiNi_{1-x}Mn_xO_2$ (x<0.45), wherein the manganese source is manganese nitrate, and the lithium source is either lithium hydroxide or lithium nitrate.

U.S. Pat. No. 5,393,622 (Y. Nitta et al., Matsushita) discloses a process to prepare $LiNi_{1-x}Mn_xO_2$ by a two-step heating, involving pre-drying, cooking and the final heating. The final heating is done in an oxidizing gas such as air or oxygen. This patent focuses on oxygen. The disclosed method uses a very low temperature of 550 to 650° C. for cooking, and less than 800° C. for sintering. At higher temperatures, samples deteriorate dramatically. Excess lithium is used such that the final samples contain a large amount of water-soluble base (i.e., lithium compounds). According to the research performed by the inventors of the present invention, the observed deterioration is attributable to the presence of lithium salts as impurities which melt at about 700 to about 800° C., thereby detaching the crystallites.

WO 9940029 A1 (M. Benz et al., H. C. Stack) describes a complicated preparation method very different from that disclosed in the present invention. This preparation method involves the use of lithium nitrates and lithium hydroxides and recovering the evolved noxious gasses. The sintering temperature never exceeds 800° C. and typically is far lower.

U.S. Pat. No. 4,980,080 (Lecerf, SAFT) describes a process to prepare $LiNiO_2$-based cathodes from lithium hydroxides and metal oxides at temperatures below 800° C.

In prior arts including the above, $LiNiO_2$-based cathode active materials are generally prepared by high cost processes, in a specific reaction atmosphere, especially in a flow of synthetic gas such as oxygen or synthetic air, free of $CO_2$, and using $LiOH.H_2O$, Li nitrate, Li acetate, etc., but not the inexpensive, easily manageable $Li_2CO_3$. Furthermore, the final cathode active materials have a high content of soluble bases, originating from carbonate impurities present in the precursors, which remain in the final cathode because of the thermodynamic limitation. Further, the crystal structure of the final cathode active materials per se is basically unstable even when the final cathode active materials are substantially free of soluble bases. Consequently, upon exposure to air containing moisture or carbon dioxide during storage of the active materials, lithium is released to surfaces from the crystal structure and reacts with air to thereby result in continuous formation of soluble bases.

Meanwhile, Japanese Unexamined Patent Publication Nos. 2004-281253, 2005-150057 and 2005-310744 disclose oxides having a composition formula of $Li_aMn_xNi_yM_zO_2$ (M=Co or Al, 1≤a≤1.2, 0≤x≤0.65, 0.35≤y≤1, 0≤z≤0.65, and x+y+z=1). These inventions provide a method of preparing the oxide involving mixing each transition metal precursor with a lithium compound, grinding, drying and sintering the mixture, and re-grinding the sintered composite oxide by ball milling, followed by heat treatment. In addition, working examples disclosed in the above prior art employ substantially only LiOH as a lithium source. Further, it was found through various experiments conducted by the inventors of the present invention that the aforesaid prior art composite oxide suffers from significant problems associated with a high-temperature safety, due to production of large amounts of impurities such as $Li_2CO_3$.

Alternatively, encapsulation of high $Ni$—$LiNiO_2$ by $SiO_x$ protective coating has been proposed (H. Omanda, T. Brousse, C. Marhic, and D. M. Schleich, *J. Electrochem. Soc.* 2004, 151, A922), but the resulting electrochemical properties are very poor. In this connection, the inventors of the present invention have investigated the encapsulation by $LiPO_3$ glass. Even where a complete coverage of the particle is accomplished, a significant improvement of air-stability could not be made and electrochemical properties were poor.

Therefore, there is a strong need for the development of a $LiNiO_2$-based cathode active material that can be produced at a low cost from inexpensive precursors, and which show improved properties such as low swelling when applied to commercial lithium secondary batteries, improved chemical stability and improved structural safety, and high capacity.

SUMMARY OF THE INVENTION

Therefore, the present invention is provided herewith in view of the above problems and other technical problems that have yet to be resolved.

As a result of a variety of extensive and intensive studies and experiments and in view of the problems as described above, the inventors of the present invention provide herewith a cathode active material, containing a lithium mixed transition metal oxide having a given composition, prepared by a solid-state reaction of $Li_2CO_3$ with a mixed transition metal precursor under an oxygen-deficient atmosphere, and being substantially free of $Li_2CO_3$, exhibits a high capacity, excellent cycle characteristics, significantly improved storage and high-temperature stability, and can be produced with low production costs and improved production efficiency. The present invention has been completed based on these findings.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

In accordance with an aspect of the present invention, the above can be accomplished by the provision of a cathode active material comprising a lithium mixed transition metal oxide having a composition represented by Formula I below, prepared by a solid-state reaction of Li$_2$CO$_3$ and a mixed transition metal precursor under an oxygen-deficient atmosphere, and having a Li$_2$CO$_3$ content of less than 0.07% by weight of the cathode active material as determined by pH titration:

$$Li_xM_yO_2 \quad (I)$$

wherein:

M=M'$_{1-k}$A$_k$, wherein M' is Ni$_{1-a-b}$(Ni$_{1/2}$Mn$_{1/2}$)$_a$Co$_b$, 0.65≤a+b≤0.85 and 0.1≤b≤0.4;

A is a dopant;

0≤k≤0.05; and x+y≈2 and 0.95≤x≤1.05.

Therefore, owing to a low Li$_2$CO$_3$ content of less than 0.07% by weight, the cathode active material comprising a high-Ni lithium mixed transition metal oxide having a the above composition so provided in accordance with the present invention has excellent sintering and storage stability, excellent high-temperature stability including decreased gas evolution, and a high capacity and excellent cycle characteristics due to a stable crystal structure. The cathode active material is prepared by a simple solid-state reaction in air, using a raw material that is environmentally-friendly, cheap and easy to handle, so the present invention can be applied to industrial-scale production of the cathode active material, at low production cost and high production efficiency.

As used herein, the term "high-Ni" means that a content of nickel is high relative to the other transition metals present which constitute the lithium mixed transition metal oxide, such as nickel, manganese, cobalt, and the like. Hereinafter, where appropriate throughout the specification, the term "lithium mixed transition metal oxide in accordance with the present invention" is used interchangeably with the term "LiNiMO$_2$". Therefore, NiM in LiNiMO$_2$ is a suggestive expression representing a complex composition of Ni, Mn and Co and a high-Ni content in Formula I.

Figure 3:
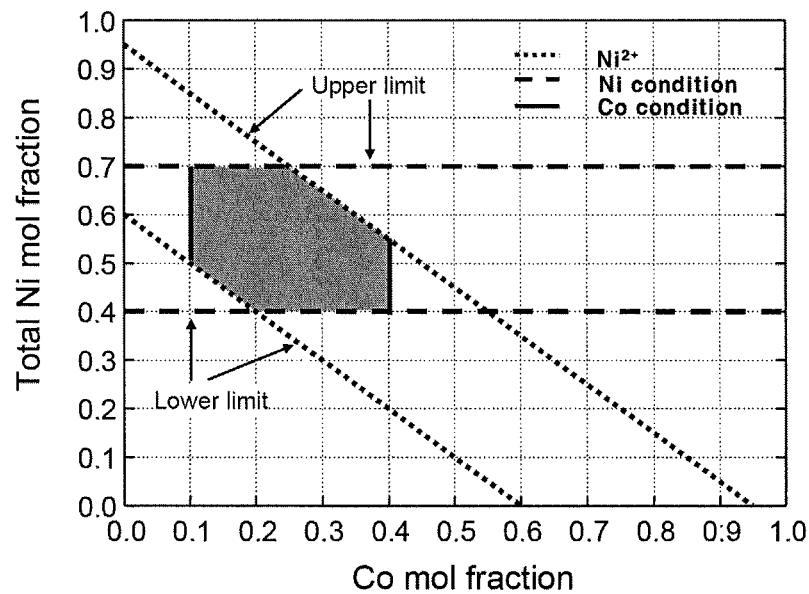
FIGS. 3 and 4 are graphs showing a preferred composition range of a Ni-based lithium mixed transition metal oxide prepared by a method according to one embodiment.
Figure 4:
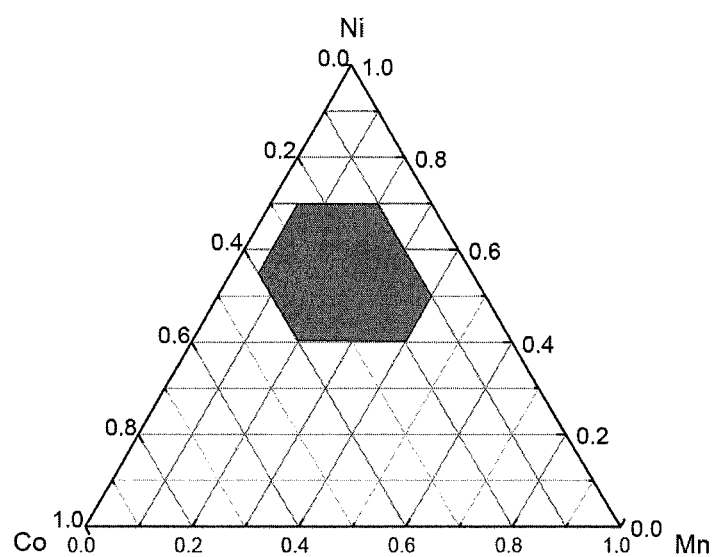

The composition of the lithium mixed transition metal oxide should satisfy the following specific requirements as defined in Formula I or as shown in FIG. 3:

(i) Ni$_{1-(a+b)}$(Ni$_{1/2}$Mn$_{1/2}$)$_a$Co$_b$ and 0.65≤a+b≤0.85

(ii) 0.1≤b≤0.4, and (iii) x+y≈2 and 0.95≤x≤1.05

Regarding the aforementioned requirement (i), Ni$_{1-(a+b)}$ means a content of Ni$^{3+}$. Therefore, if a mole fraction of Ni$^{3+}$ exceeds 0.35 (a+b<0.65), it is impossible to implement an industrial-scale production in air, using Li$_2$CO$_3$ as a raw material, so the lithium mixed transition metal oxide should be produced using LiOH as a raw material under an oxygen atmosphere, thereby presenting a problems associated with decreased production efficiency and consequently increased production costs. On the other hand, if a mole fraction of Ni$^{3+}$ is lower than 0.15 (a+b>0.85), the capacity per volume of LiNiMO$_2$ is not competitive as compared to LiCoO$_2$.

With regard to the aforementioned requirement (ii), a content of cobalt (b) is from 0.1 to 0.4. If the content of cobalt is excessively high (b>0.4), the overall cost of a raw material increases due to high content of cobalt, and the reversible capacity decreases. On the other hand, if the content of cobalt is excessively low (b<0.1), it is difficult to achieve sufficient rate characteristics and a high powder density of the battery at the same time.

Meanwhile, taking into consideration both of the above requirements (i) and (ii), the total mole fraction of Ni including Ni$^{2+}$ and Ni$^{3+}$ in LiNiMO$_2$ of the present invention is specifically a relatively nickel-excess as compared to manganese and cobalt and can be from 0.4 to 0.7. If a content of nickel is excessively low, it is difficult to achieve a high capacity. Conversely, if a content of nickel is excessively high, the safety can be significantly lowered. In conclusion, the lithium transition metal oxide (LiNiMO$_2$) exhibits a large volume capacity and low raw material costs, as compared to lithium cobalt-based oxides.

Further, if the mole fraction of Ni$^{2+}$ is too high relative to the Ni content, the cation mixing increases to thereby result in formation of an excessively stable "rock salt" type structure that is locally and electrochemically non-reactive, where such a rock salt structure not only hinders charge/discharge and but also can bring about a decrease in a discharge capacity. On the other hand, if the mole fraction of Ni$^{2+}$ is too low, this can lead to an increase in the structural instability which thereby lowers the cycle stability. Therefore, the mole fraction of Ni$^{2+}$ should be appropriately adjusted taking into consideration such problems that can occur. Specifically, within the range as shown in FIG. 3, the mole fraction of Ni$^{2+}$ can be from 0.05 to 04, based on the total content of Ni.

With regard to the aforementioned condition (iii), if a content of lithium is excessively high, i.e. x>1.05, this may result in a problem of decreased stability during charge/ discharge cycling, particularly at T=60° C. and a high voltage (U=4.35 V). On the other hand, if a content of lithium is excessively low, i.e. x<0.95, this may result in poor rate characteristics and a decreased reversible capacity.

In an embodiment, LiNiMO$_2$ may further comprise trace amounts of dopants. Examples of the dopants may include aluminum, titanium, magnesium and the like, which are incorporated into the crystal structure. Further, other dopants, such as B, Ca, Zr, F, P, Bi, Al, Mg, Zn, Sr, Ga, In, Ge, and Sn, may be included via the grain boundary accumulation or surface coating of the dopants without being incorporated into the crystal structure. These dopants are included in amounts sufficient to increase the safety, capacity and overcharge stability of the battery while not causing a significant decrease in the reversible capacity. Therefore, a content of the dopant is less than 5% by mole (k<0.05), as defined in Formula I. In addition, the dopants may be specifically added in an amount of <1% by mole, within a range that can improve the stability without causing deterioration of the reversible capacity.

Typically, Ni-based lithium mixed transition metal oxides contain large amounts of water-soluble bases such as lithium oxides, lithium sulfates, lithium carbonates, and the like. These water-soluble bases may be bases, such as Li$_2$CO$_3$ and LiOH, present in LiNiMO$_2$, or otherwise can be bases produced by ion exchange (H$^+$ (water)$\leftarrow\rightarrow$Li$^+$ (surface, an outer surface of the bulk)), performed at the surface of LiNiMO$_2$. The bases of the latter case are usually present at a negligible level.

The former water-soluble bases may be formed due to the presence of unreacted lithium raw materials primarily upon sintering. This is because as production of conventional Ni-based lithium mixed transition metal oxides involves an addition of relatively large amounts of lithium and a low-temperature sintering process so as to prevent the disintegration of a layered crystal structure, the resulting particles have relatively large amounts of grain boundaries as compared to the cobalt-based oxides, and a sufficient reaction of lithium ions is not realized upon sintering.

In addition, even when an initial amount of Li$_2$CO$_3$ is low, Li$_2$CO$_3$ may also be produced during fabrication of the battery or storage of electrode active materials. These water-soluble bases react with electrolytes in the battery to thereby cause gas evolution and battery swelling, which consequently result in severe deterioration of the high-temperature safety.

On the other hand, since the cathode active material in accordance with the present invention, as defined above, stably maintains the layered crystal structure by a specific composition of transition metal elements and a reaction atmosphere, despite the use of Li$_2$CO$_3$ as a raw material, it is possible to carry out the sintering process at a high-temperature, thereby resulting in small amounts of grain boundaries. In addition, as retention of unreacted lithium on surfaces of particles is prevented, the particle surfaces are substantially free of water-soluble bases such as lithium carbonates, lithium sulfates, and the like. Accordingly, the present invention is characterized in that Li$_2$CO$_3$ is contained in a trace amount of less than 0.07% by weight of the cathode active material.

In the present invention, the content of Li$_2$CO$_3$ includes all of Li$_2$CO$_3$ remaining upon production of the lithium mixed transition metal oxide, or Li$_2$CO$_3$ produced during fabrication of the battery or storage of electrode active materials.

The content of Li$_2$CO$_3$ refers to an extent that upon titration of 200 mL of a solution containing a cathode active material powder with an acid titrant solution, e.g., 0.1M HCl, the acid titrant solution used to reach a pH of less than 5 is specifically an amount of less than 20 mL, more specifically less than 10 mL, which corresponds to a content of Li$_2$CO$_3$ impurity of about 0.2% by weight or less. Herein, 200 mL of the aforementioned solution contains substantially all kinds of the water-soluble bases in the cathode active material, and is prepared by repeatedly soaking and decanting 10 g of the cathode active material with water. There are no significant influences of parameters such as a total soaking time of the cathode active material powder in water on the amount of water-soluble base extracted.

Therefore, the content of Li$_2$CO$_3$ can be determined in terms of an amount of acid solution titrant (e.g., HCl) used to reach pH of less than 5, according to the following method. To accomplish this, 5 g of a cathode active material powder is added to 25 mL of water, followed by brief stirring to effect a soaking process. About 20 mL of the clear solution is separated from the powder after soaking by decanting, and the separated solutions are pooled. Again, about 20 mL of water is added to the powder and the resulting mixture is stirred, followed by decanting and pooling. The soaking and decanting are repeated at least 5 times. In this manner, a total of 100 mL of the clear solution containing water-soluble bases is pooled. In another exemplary embodiment, this process can be scaled such that 10 g of the cathode active material is extracted with water by the above soaking and decanting process at least 5 times to provide a total of 200 mL of a solution containing the water-soluble base. A 0.1M HCl solution is added to the thus-pooled solution, followed by pH titration with stirring. The pH is recorded as a function of time. Experiments are terminated when the pH reaches a value of less than 3, and the flow rate may be selected such that titration takes about 20 to about 30 min.

One of important features of the present invention is that a desired cathode active material is prepared by a solid-state reaction of Li$_2$CO$_3$ and a mixed transition metal precursor under an oxygen-deficient atmosphere.

In this way, it was found through various experiments conducted by the inventors of the present invention that when conventional high-nickel LiMO$_2$ is sintered in air containing a trace amount of CO$_2$, LiMO$_2$ decomposes with a decrease of Ni$^{3+}$ as shown in the following reaction below, during which amounts of Li$_2$CO$_3$ impurities increase.

$$LiM^{3+}O_2+CO_2 \rightarrow aLi_{1-x}M_{1+x1}^{3+,2+}O_2+bLi_2CO_3+cO_2$$

This is believed to be due to that the decomposition of some Ni$^{3+}$ into Ni$^{2+}$ upon sintering results in destabilization of the crystal structure, which consequently leads to an oxide form having excessive cation mixing, i.e. Li-deficient form of Li$_{1-a}$Ni$_{1+a}$O$_2$ having transition metal cations misplaced on lithium sites of the crystal structure, and lithium ions, released from partial collapse of the crystal structure, react with CO$_2$ in air.

The conventional methods of preparing high-nickel LiMO$_2$ thus suffer from the use of Li$_2$CO$_3$ as a raw material, which brings about the evolution of CO$_2$ due to decomposition of Li$_2$CO$_3$, and which then thermodynamically hinders further decomposition of Li$_2$CO$_3$ necessary for the reaction even at a low partial pressure of CO$_2$, consequently resulting in no further progression of the reaction. In addition, excessive addition of Li$_2$CO$_3$ is accompanied by a problem of residual Li$_2$CO$_3$ after the reaction.

Therefore, in order to prevent such problems associated with the lithium-deficiency and cation mixing and in order to increase a relative amount of Ni$^{3+}$ increased over that of the conventional methods, the production reaction for lithium mixed transition metal oxides could be carried out using an excessive amount of $LiOH \cdot H_2O$ as a lithium source, with a ratio of $M(OH)_2$ and Li of 1:1.05 to 1.15 ($M(OH)_2$:Li-compound) under a high-oxygen atmosphere.

However, $LiOH \cdot H_2O$ (technical grade) contains primarily >1% by weight $Li_2CO_3$ impurities that are not decomposed or removed during the sintering process under an oxygen atmosphere and therefore remain in the final product. Further, an excess of the residual $Li_2CO_3$ accelerates the electrolyte decomposition to thereby result in the evolution of gas. Therefore, the conventional method suffered from various problems such as disintegration of secondary particles into single primary crystallites, lowered storage stability, and deterioration of the high-temperature safety resulting from the gas evolution due to the reaction of the residual $Li_2CO_3$ with the electrolyte in the battery.

Figure 1:
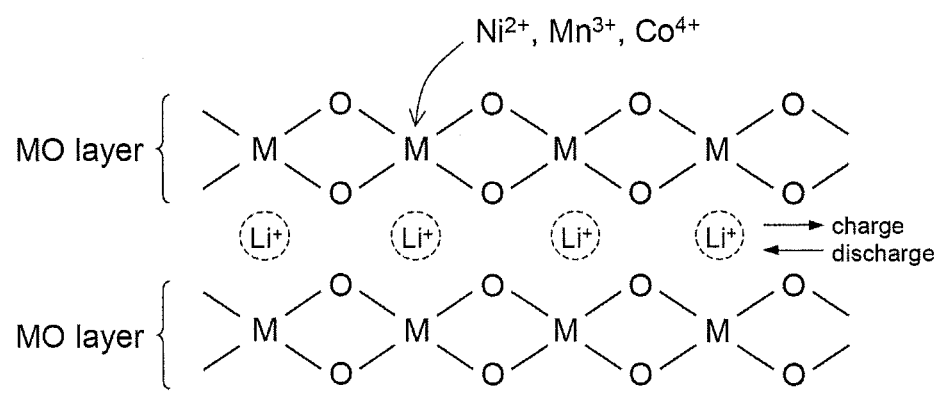
FIG. 1 is a schematic view showing a crystal structure of a conventional Ni-based lithium transition metal oxide.

Further, the lithium mixed transition metal oxide prepared by a conventional method has a layered crystal structure as shown in FIG. 1, and desertion of lithium ions from the reversible lithium layers in the charged state brings about swelling and destabilization of the crystal structure due to the repulsive force between oxygen atoms in the MO layers (mixed-transition metal oxide layers), thus suffering from the problems associated with sharp decreases in the capacity and cycle characteristics, resulting from changes in the crystal structure due to repeated charge/discharge cycles.

As a result of a variety of extensive and intensive studies and experiments, the inventors of the present invention discovered that when the lithium mixed transition metal oxide is prepared by a solid-state reaction of $Li_2CO_3$ with the mixed transition metal precursor under an oxygen-deficient atmosphere, it is possible to produce a cathode active material containing the lithium mixed transition metal oxide substantially free of $Li_2CO_3$, i.e., having a $Li_2CO_3$ content of less than 0.07% by weight, of the cathode active material as determined by pH titration. In a specific embodiment, the $Li_2CO_3$ content is less than 0.05% by weight of the cathode active material as determined by pH titration. In a more specific embodiment, the $Li_2CO_3$ content is less than 0.035% by weight of the cathode active material as determined by pH titration. In another embodiment, a cathode active material comprising a comparative lithium transition metal oxide that is not prepared by the solid-state reaction of $Li_2CO_3$ and a mixed transition metal precursor under an oxygen-deficient atmosphere, has a $Li_2CO_3$ content of greater than or equal to 0.07% by weight of the cathode active material.

Figure 2:
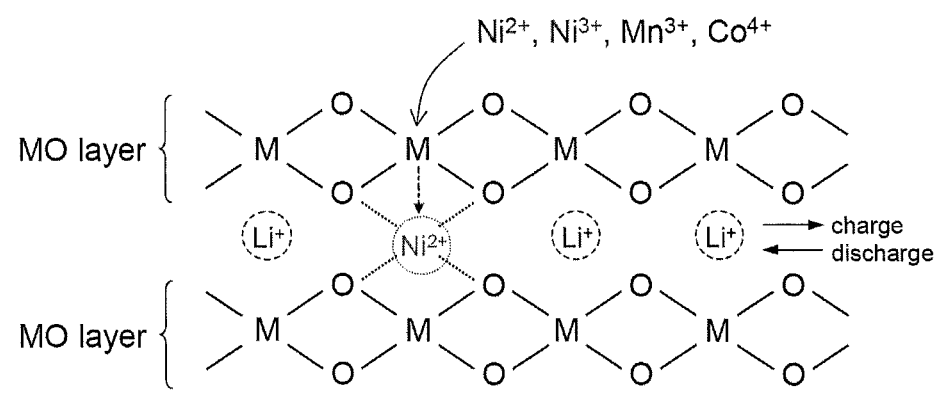
FIG. 2 is a schematic view showing a crystal structure of a Ni-based lithium mixed transition metal oxide prepared by a method according to one embodiment.

Specifically, under the oxygen-deficient atmosphere, desorption of some oxygen atoms takes place from the MO layers, which leads to a decrease in an oxidation number of Ni, thereby increasing amounts of $Ni^{2+}$ ions. As a result, a portion of the $Ni^{2+}$ ions are inserted into the reversible lithium layers, as shown in FIG. 2. However, contrary to conventionally known or accepted ideas in the related art that intercalation/deintercalation of lithium ions will be hindered due to such insertion of $Ni^{2+}$ ions into the reversible lithium layers, an insertion of an effective amount of $Ni^{2+}$ ions prevents destabilization of the crystal structure that may occur due to the repulsive force between oxygen atoms in the MO layers, upon charge. As used herein, "an effective amount of $Ni^{2+}$ ions", can include about 3 to about 7 mole percent of the total amount of Ni ions present. Therefore, stabilization of the crystal structure is achieved to result in no occurrence of further structural collapse by oxygen desorption. Further, it is believed that the lifespan characteristics and safety are simultaneously improved, due to no further formation of $Ni^{2+}$ ions with maintenance of the oxidation number of Ni ions inserted into the reversible lithium layers, even when lithium ions are released during a charge process. Hence, it can be said that such a concept of the present invention is a remarkable one which is completely opposite to and overthrows the conventional idea.

Thus, the present invention can fundamentally prevent the problems that may occur due to the presence of the residual $Li_2CO_3$ in the final product (i.e., the cathode active material), and provides a highly economical process by performing the production reaction using a relatively small amount of inexpensive $Li_2CO_3$ as a reactant and an oxygen-deficient atmosphere such as air. Further, the sintering and storage stabilities are excellent due to the stability of the crystal structure, and thereby the battery capacity and cycle characteristics can be significantly improved simultaneously with a desired level of rate characteristics.

However, under an atmosphere with excessive oxygen-deficiency, an excessive amount of $Ni^{2+}$ ions transfer to the reversible lithium layers during the synthesis process, thereby resulting in hindrance of the intercalation/deintercalation of lithium ions, and therefore the performance of the battery cannot be exerted sufficiently. On the other hand, if the oxygen concentration is excessively high, the desired amount of $Ni^{2+}$ cannot be inserted into the reversible lithium layers. Taking into consideration such problems, the synthetic reaction may be carried out under an atmosphere with an oxygen concentration of specifically 10% to 50% by volume, and more specifically 10% to 30% by volume. In an exemplary embodiment, the reaction can be carried out under an air atmosphere.

Another feature of the present invention is that raw materials produced by an inexpensive or economical process and being easy to handle can be used, and particularly $Li_2CO_3$ which is difficult to employ in the prior art can be used itself as a lithium source.

As an added amount of $Li_2CO_3$ as the lithium source decreases, that is, a molar ratio (Li/M) of lithium to the mixed transition metal source (M) decreases, an amount of Ni inserted into the MO layers gradually increases. Therefore, if excessive amounts of Ni ions are inserted into the reversible lithium layers, the movement of $Li^+$ ions during charge/discharge processes is hampered, which thereby leads to problems associated with a decrease in the capacity or deterioration of the rate characteristics. On the other hand, if an added amount of $Li_2CO_3$ is excessively large, that is, the Li/M molar ratio is excessively high, the amount of Ni inserted into the reversible lithium layers is excessively low, which may undesirably lead to structural instability, thereby presenting decreased safety of the battery and poor lifespan characteristics. Further, at a high Li/M value, amounts of unreacted $Li_2CO_3$ increase to thereby result in a high pH-titration value, i.e., production of large amounts of impurities, and consequently the high-temperature safety may deteriorate.

Therefore, in one embodiment, an added amount of $Li_2CO_3$ as the lithium source can be from 0.95 to 1.04:1 where the ratio of $Li_2CO_3$:mixed transition metal raw material is a w/w ratio, based on the weight of the mixed transition metal as the other raw material.

As a result, the product is substantially free of impurities due to a lack of surplus $Li_2CO_3$ in the product (the cathode active material) by adding only a stoichiometric amount (i.e., by not adding an excess) of the lithium source, so that there are no problems associated with residual $Li_2CO_3$, and thereby a relatively small amount of inexpensive $Li_2CO_3$ is used to provide a lithium mixed transition metal compound in a highly economical process.

As the mixed transition metal precursor, $M(OH)_2$ or MOOH (M is as defined in Formula I) can be used specifically. As used herein, the term "mixed" means that several transition metal elements are well mixed at the atomic level.

In conventional processes, as the mixed transition metal precursors, mixtures of Ni-based transition metal hydroxides are generally employed. However, these materials commonly contain carbonate impurities. This is because $Ni(OH)_2$ is prepared by co-precipitation of a Ni-based salt such as $NiSO_4$ with a base such as NaOH in which the technical grade NaOH contains $Na_2CO_3$ and the $CO_3^{2-}$ anion is more easily inserted into the $Ni(OH)_2$ structure than the OH anion.

Further, in order to increase an energy density of the cathode active material, conventional prior art processes employed MOOH having a high tap density of 1.5 to 3.0. However, the use of such a high tap density precursor makes it difficult to achieve the incorporation of the reactant (lithium) into the inside of the precursor particles during the synthetic process, which then lowers the reactivity to thereby result in production of large amounts of impurities. Further, for preparation of MOOH having a high tap density, co-precipitation of $MSO_4$ and NaOH should be carried out in the presence of excess ammonia as a complexing additive. However, ammonia in waste water causes environmental problems and thus is strictly regulated. It is, however, generally not possible to prepare the mixed oxyhydroxide having high density by an ammonia-free process that is less expensive, is more environmentally friendly and is easier to carry out than this process.

However, according to the research performed by the inventors of the present invention, it was found that even though the mixed transition metal precursor prepared by the ammonia-free process exhibits a relatively low tap density, a lithium mixed transition metal oxide prepared using the thus-prepared precursor which has an excellent sintering stability makes it is possible to prepare a mixed transition metal oxide having a superior reactivity.

In this way, the cathode active material in accordance with the present invention, as discussed hereinbefore, can maintain a well-layered structure due to the insertion of some Ni ions into the reversible lithium layers, thus exhibiting excellent sintering stability. Accordingly, the present invention can employ the mixed transition metal precursor having a low tap density, as the raw material.

Therefore, since the raw material, i.e., the mixed transition metal precursor, is environmentally friendly, can be easily prepared at low production costs and also has a large volume of voids between primary particles, e.g. a low tap density, it is possible to easily realize the introduction of the lithium source into the inside of the precursor particles, thereby improving the reactivity, and it is also possible to prevent production of impurities and reduce an amount of the lithium source ($Li_2CO_3$) to be used, so the method of the present invention is highly economical.

As used herein, the term "ammonia-free process" means that only NaOH without the use of aqueous ammonia is used as a co-precipitating agent in a co-precipitation process of a metal hydroxide. That is, the transition metal precursor is obtained by dissolving a metal salt such as $MSO_4$ and $MNO_3$ (M is a metal of a composition to be used) in water, and gradually adding a small amount of a precipitating agent NaOH with stirring. The introduction of ammonia lowers the repulsive force between particles to thereby result in densification of co-precipitated particles, which then increases a density of particles. However, when it is desired to obtain a hydroxide having a low tap density as in the present invention, there is no need to employ ammonia. In addition to the above-exemplified sulfates and nitrates, other materials may be employed as the metal salt.

In one specific embodiment, the tap density of the mixed transition metal precursor may be from 1.1 to 1.6 $g/cm^3$. If the tap density is excessively low, a chargeable amount of the active material decreases, so the capacity per volume may be lowered. On the other hand, if the tap density is excessively high, the reactivity with the lithium source material is lowered and therefore impurities may be undesirably formed.

The solid-state reaction includes a sintering process specifically at 600 to 1,100° C. for 3 to 20 hours, and more specifically 800 to 1,050° C. for 5 to 15 hours. If the sintering temperature is excessively high, this may lead to non-uniform growth of particles, and reduction of the volume capacity of the battery due to a decreased amount of particles that can be contained per unit area, arising from an excessively large size of particles. On the other hand, if the sintering temperature is excessively low, an insufficient reaction leads to the retention of the raw materials in the particles, thereby presenting the risk of damaging the high-temperature safety of the battery, and it may be difficult to maintain a stable structure, due to the deterioration of the volume density and crystallinity. Further, if the sintering time is too short, it is difficult to obtain a lithium nickel-based oxide having high crystallinity. On the other hand, if the sintering time is too long, this may undesirably lead to excessively large particle diameter and reduced production efficiency.

Meanwhile, various additional parameters may arise as the process for preparation of the lithium mixed transition metal oxide is scaled up. A few grams of samples in a furnace behave very differently from a few kg of samples, because the gas transport kinetics at a low partial pressure is completely different. Specifically, in a small-scale process, Li evaporation occurs and $CO_2$ transport is fast, whereas in a large-scale process, these processes are retarded. Where the Li evaporation and $CO_2$ transport are retarded, a gas partial pressure in the furnace increases, which in turn hinders further decomposition of $Li_2CO_3$ necessary for the reaction, consequently resulting in retention of the unreacted $Li_2CO_3$, and the resulting $LiNiMO_2$ decomposes to result in the destabilization of the crystal structure.

Accordingly, when it is desired to prepare the lithium mixed transition metal oxide in accordance with the present invention on a large-scale, the preparation process is specifically carried out under a high rate of air circulation. As used herein, the term "large scale" means that a sample has a size of 5 kg or more because similar behavior is expected in 100 kg of sample when the process has been correctly scaled-up, i.e., a similar gas flow ($m^3$/kg of sample) reaches 100 kg of sample.

In order to achieve high air circulation upon the production of the lithium transition metal oxide by the large-scale mass production process, specifically at least 2 $m^3$ (volume at room temperature) of air, and more specifically at least 10 $m^3$ of air, per kg of the final product (active material), i.e., lithium mixed transition metal oxide, may be pumped into or out of a reaction vessel. As such, even when the present invention is applied to a large-scale production process, it is possible to prepare the cathode active material which is substantially free of impurities including water-soluble bases.

In an embodiment of the present invention, a heat exchanger may be employed to minimize energy expenditure upon air circulation by pre-warming the in-flowing air before it enters the reaction vessel, while cooling the out-flowing air.

In a specific example, air flow of 2 m³/kg corresponds to about 1.5 kg of air at 25° C. The heat capacity of air is about 1 kJ/kg° K and the temperature difference is about 800K. Thus, at least about 0.33 kWh is required per kg of the final sample for air heating. Where the air flow is 10 m³, about 2 kWh is then necessary. Thus, the typical additional energy cost amounts to about 2 to about 10% of the total cathode sales price. The additional energy cost can be significantly reduced when the air-exchange is made by using a heat exchanger. In addition, the use of the heat exchanger can also reduce the temperature gradient in the reaction vessel. To further decrease the temperature gradient, it is recommended to provide several air flows into the reaction vessel simultaneously.

The cathode active material in accordance with the present invention may be comprised only of the lithium mixed transition metal oxide having the above-specified composition or, where appropriate, it may be comprised of the lithium mixed transition metal oxide in conjunction with other lithium-containing transition metal oxides.

Examples of the lithium-containing transition metal oxides that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ ($0 \leq y \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxides of Formula $LiNi_{1-y}M_yO_2$ (M=Co, Mn, Al, Cu, Fe, Mg, B, or Ga, and $0.01 \leq y \leq 0.3$); lithium manganese composite oxides of Formula $LiMn_{2-y}M_yO_2$ (M=Co, Ni, Fe, Cr, Zn, or Ta, and $0.01 \leq y \leq 0.1$), or Formula $Li_2Mn_3MO_8$ (M=Fe, Co, Ni, Cu, or Zn); $LiMn_2O_4$ wherein a portion of Li is substituted with alkaline earth metal ions; disulfide compounds; and $Fe_2(MoO_4)_3$, $LiFe_3O_4$, and the like.

In accordance with another aspect of the present invention, there is provided a lithium secondary battery comprising the aforementioned cathode active material. The lithium secondary battery is generally comprised of a cathode, an anode, a separator and a lithium salt-containing non-aqueous electrolyte. Methods for preparing the lithium secondary battery are well-known in the art and therefore detailed description thereof will be omitted herein.

In accordance with a further aspect of the present invention, there is provided a method for determining the total amount of water-soluble base contained in a cathode active material from the amount of an aqueous acid solution titrant neutralized by pH titration of a solution containing the water-soluble base until the pH of the solution reaches a value of less than 5, wherein the solution of water-soluble base is prepared by repeatedly soaking and decanting 10 g of the cathode active material with water until the resulting solution contains all of the water-soluble bases in the cathode active material. In an embodiment, the acid solution titrant is 0.1M HCl solution. In another embodiment, the total volume of the solution of water-soluble base is 200 mL That is, all of the water-soluble bases contained in a cathode active material are readily dissolved by repeated soaking and decanting of the cathode active material, so the amount of the water-soluble bases can be precisely determined in a reproducible manner. Therefore, it is possible using this method to predict probable deterioration of high-temperature safety or cycle characteristics that may occur due to the presence of impurities in the battery fabricated using the cathode active material. Knowledge about the content of the water-soluble bases can be a potent method for use in the development of a cathode active material having superior storage stability as disclosed herein.

Upon pH titration with addition of 0.1M HCl, this process is generally negligible at normal speed (i.e., about 30 min), but is carried out for 5 hours or less. This is because deviations of the pH profile may occur in a slow ion-exchange process ($H^+$ in the solution←→$Li^+$ in the powder). Such deviations of the pH profile would occur mostly at pH of less than about 5.

Upon only measuring pH, for example, as described in EP 1 317 008 A2, even a small amount of LiOH-type impurities can give a higher pH than that obtained for a significantly harmful $Li_2CO_3$ impurities. Therefore, it is important to measure the pH profile in order to characterize which soluble bases are present. Accordingly, in one preferred embodiment, it is possible to understand the properties of the water-soluble bases from pH profile, by recording of the pH profile upon pH titration.

Appropriate modifications may be made with kinds and concentrations of acids used for pH titration, a reference pH and the like, and it should be understood that those modifications are apparent to those skilled in the art and fall within the scope of the invention.

EXAMPLES

Now, the present invention will be described in more detail with reference to the following Examples. These examples are provided only for illustrating the present invention and should not be construed as limiting the scope and spirit of the present invention. For reference, the content of water-soluble bases contained in the powder in the working examples was measured according to the following method.

Contents and Characterization of Water-Soluble Bases (pH Titration)

First, 5 g of a cathode active material powder was added to 25 mL of water, followed by brief stirring. About 20 mL of a clear solution was separated after this soaking from the powder by decanting and pooling the supernatant. Again, about 20 mL of water was added to the powder and the resulting mixture was soaked and stirred, followed by decanting and pooling. The soaking and decanting were repeated at least 5 times. In this manner, a total of 100 mL of the clear solution containing water-soluble bases was pooled. A 0.1M HCl solution was added to the thus-pooled solution, followed by pH titration with stirring. The pH was recorded as a function of time. Experiments were terminated when the pH reached a value of less than about 3, and a flow rate was appropriately selected within a range in which titration takes about 20 to about 30 min. The content of the water-soluble bases was measured as an amount of acid that was used until the pH reaches a value of less than about 5. Characterization of water-soluble bases was made from the pH profile.

Example 1

A mixed oxyhydroxide of Formula MOOH (M=$Ni_{4/15}$ $(Mn_{1/2}Ni_{1/2})_{8/15}Co_{0.2}$) as a mixed transition metal precursor and $Li_2CO_3$ were mixed in a stoichiometric molar ratio (Li:M=1.02:1), and the mixture was sintered in air at temperatures of 850 (Ex. 1A), 900 (Ex. 1B), 950 (Ex. 1C), and 1,000° C. (Ex. 1D) for 10 hours, to prepare a lithium mixed transition metal oxide. Herein, secondary particles were maintained intact without being collapsed, and the crystal size increased with an increase in the sintering temperature.

X-ray analysis showed that all samples have a well-layered crystal structure. Further, a unit cell volume did not exhibit a significant change with an increase in the sintering temperature, thus representing that there was no significant oxygen-deficiency and no significant increase of cation mixing, in conjunction with essentially no occurrence of lithium evaporation.

Figure 5:
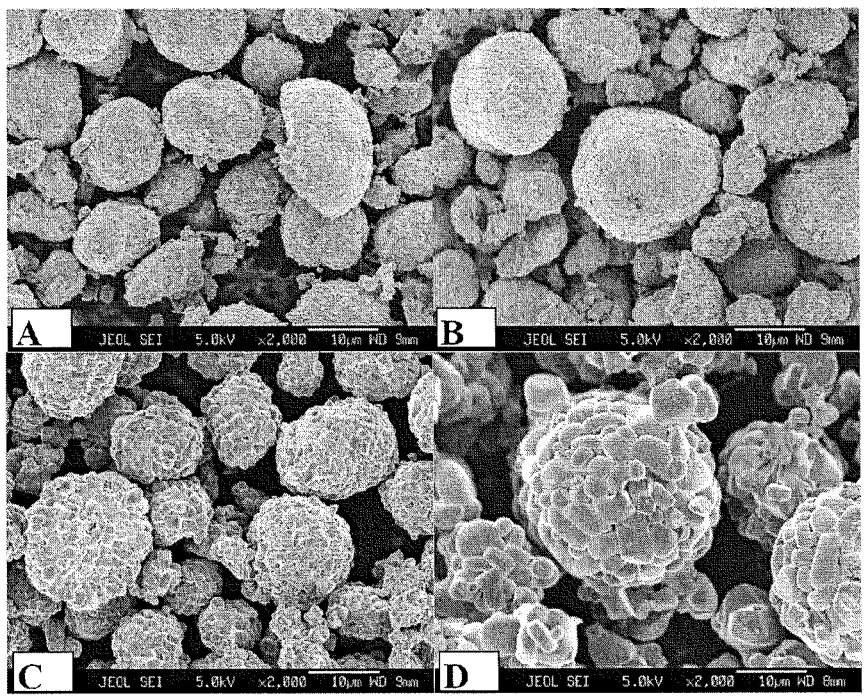
FIG. 5 is an FESEM (Field Emission Scanning Electron Microscope) image (×2,000) showing $LiNiMO_2$ according to Example 1. 5A: 850° C.; 5B: 900° C.; 5C: 950° C.; and 5D: 1,000° C.

The crystallographic data for the thus-prepared lithium mixed transition metal oxide are given in Table 1 below, and FESEM images thereof are shown in FIG. 5. From these results, it was found that the lithium mixed transition metal oxide is $LiNiMO_2$ having a well-layered crystal structure with the insertion of nickel at a level of 3.9 to 4.5% into the reversible lithium layer. Further, it was also found that even though $Li_2CO_3$ was used as a raw material and sintering was carried out in air, a sufficient amount of $Ni^{2+}$ ions was inserted into the lithium layer, thereby achieving the desired structural stability.

Particularly, Sample B, sintered at 900° C. (Ex. 1B), exhibited a high c:a ratio and therefore excellent crystallinity, a low unit cell volume and a reasonable cation mixing ratio. As a result, Sample B showed the most excellent electrochemical properties, and a BET surface area of about 0.4 to about 0.8 m²/g.

TABLE 1

| Example 1(A-D) | (A) | (B) | (C) | (D) |
|---|---|---|---|---|
| Sintering temp. | 850° C. | 900° C. | 950° C. | 1,000° C. |
| Unit cell vol. | 33.902 Å³ | 33.921 Å³ | 33.934 Å³ | 33.957 Å³ |
| Normalized c:a ratio c:a/24^0.5 | 1.0123 | 1.0122 | 1.0120 | 1.0117 |
| Cation mixing (Rietveld refinement) | 4.5% | 3.9% | 4.3% | 4.5% |

Comparative Example 1

50 g of a commercial sample having a composition of $LiNi_{0.8}Co_{0.1}Mn_{0.1}O_2$ represented by Formula $LiNi_{1-x}M_xO_2$ (x=0.3, and $M=Mn_{1/3}Ni_{1/3}Co_{1/3}$) was heated in air to 750° C. (CEx. 1A), 850° C. (CEx. 1B), 900° C. (CEx. 1C) and 950° C. (CEx. 1D) (10 hrs), respectively.

Figure 6:
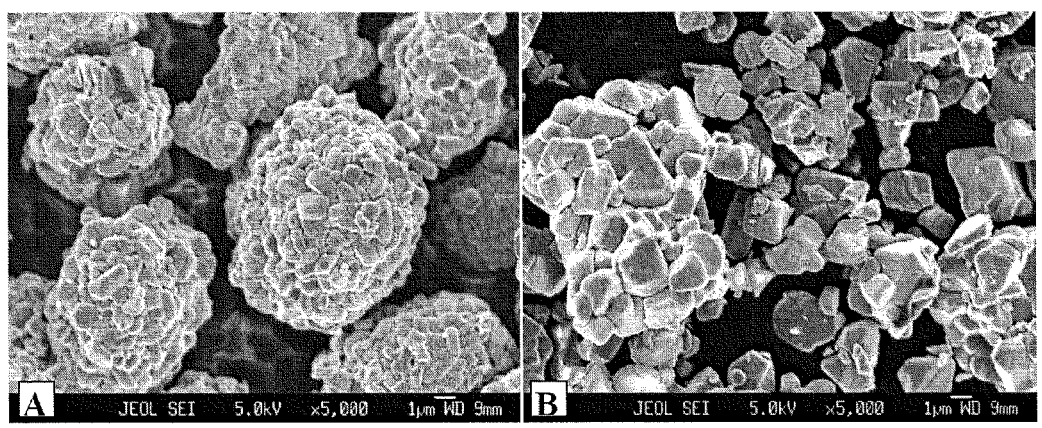
FIG. 6 is an FESEM image showing commercial $LiMO_2$ (M=$Ni_{0.8}Co_{0.2}$) according to Comparative Example 1. 6A: FESEM image of a sample as received, and 6B: FESEM image of a sample after heating to 850° C. in air.

X-ray analysis was carried out to obtain detailed lattice parameters with high resolution. Cation mixing was observed by Rietveld refinement, and morphology was analyzed by FESEM. The results thus obtained are given in Table 2 below. Referring to Table 2, it can be seen that all of the samples heated to a temperature of T≥750° C. (CEx. 1A-D) exhibited continuous degradation of a crystal structure (increased cation mixing, increased lattice constant and decreased c:a ratio). FIG. 6 shows a FESEM image of a commercial sample as received and a FESEM image of the same sample heated to 850° C. (CEx. 1B) in air; and it can be seen that the sample heated to a temperature of T≥850° C. (CEx. 1B-D) exhibited structural collapse. This is believed to be due to that $Li_2CO_3$, formed during heating in air, melts to thereby segregate particles.

TABLE 2

| Comp. Ex. 1 (A-D) | (A) | (B) | (C) | (D) |
|---|---|---|---|---|
| Sintering temp. | 750° C. | 850° C. | 900° C. | 950° C. |
| Unit cell vol. | 33.902 Å³ | 33.920 Å³ | 33.934 Å³ | 33.957 Å³ |
| Normalized c:a ratio c:a/24^0.5 | 1.0103 | 1.0100 | 1.0090 | 1.0085 |
| Cation mixing (Rietveld refinement) | 10% | 12% | 15% | 18% |

Therefore, it can be seen that it is impossible to produce a conventional lithium mixed transition metal oxide in the air containing trace amounts of carbon dioxide, due to thermodynamic limitations. In addition, upon producing the lithium mixed transition metal oxide according to a conventional method, the use of $Li_2CO_3$ as a raw material is accompanied by evolution of $CO_2$ due to decomposition of $Li_2CO_3$, thereby leading to thermodynamic hindrance of further decomposition of $Li_2CO_3$ necessary for the reaction, consequently resulting in no further progression of the reaction. For these reasons, it was shown that such a conventional method cannot be applied to the practical production process.

Comparative Example 2

Figure 7:
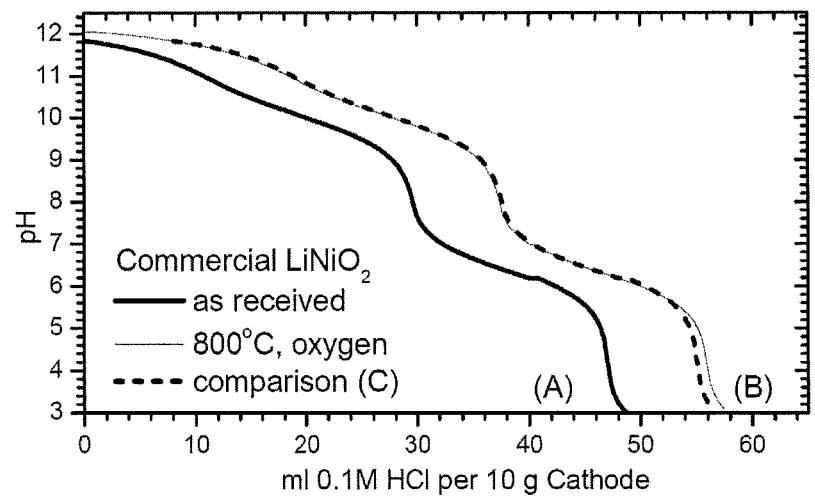
FIG. 7 is an FESEM image showing the standard pH titration curve of commercial high-Ni $LiNiO_2$ according to Comparative Example 2. A: Sample as received, B: After heating of a sample to 800° C. under an oxygen atmosphere, and C: Copy of A.

The pH titration was carried out at a flow rate of >2 L/min for 400 g of a commercial sample having a composition of $LiNi_{0.8}Co_{0.2}O_2$. The results thus obtained are given in FIG. 7. In FIG. 7, Curve A (CEx. 2A) represents pH titration for the sample as received, and Curve B (CEx. 2B) represents pH titration for the sample heated to 800° C. in a flow of pure oxygen for 24 hours. From the analysis results of pH profiles, it can be seen that the contents of $Li_2CO_3$ before and after heat treatment were the same therebetween, and there was no reaction of $Li_2CO_3$ impurities. That is, it can be seen that the heat treatment under an oxygen atmosphere resulted in no additional production of $Li_2CO_3$ impurities, but $Li_2CO_3$ impurities present in the particles were not decomposed. Through slightly increased cation mixing, a slightly decreased c:a ratio and a slightly decreased unit cell volume from the X-ray analysis results, it was found that the content of Li slightly decreased in the crystal structure of $LiNiO_2$ in conjunction with the formation of a small amount of $Li_2O$. Therefore, it can be seen that it is impossible to prepare a stoichiometric lithium mixed transition metal oxide with no impurities and no lithium-deficiency in a flow of oxygen gas or synthetic air.

Comparative Example 3

Figure 8:
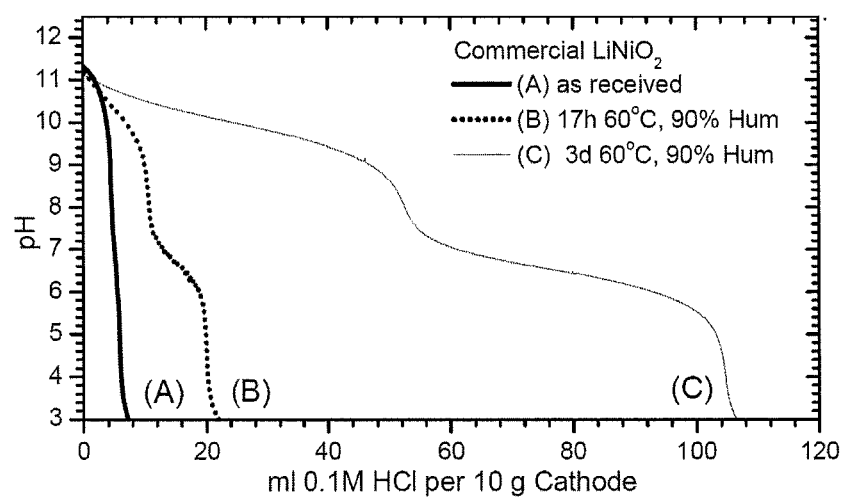
FIG. 8 is a graph showing a pH titration curve of a sample according to Comparative Example 3 during storage of the sample in a wet chamber. A: Sample as received, B: After storage of a sample for 17 hrs, and C: After storage of a sample for 3 days.

$LiAl_{0.02}Ni_{0.78}Co_{0.2}O_2$ containing less than 3% aluminum compound, as commercially available Al/Ba-modified, high-nickel $LiNiO_2$, was stored in a wet chamber (90% relative humidity, abbreviated "RH") at 60° C. in air. The pH titration was carried out for a sample prior to exposure to moisture, and samples wet-stored for 17 hrs and 3 days, respectively. The results thus obtained are given in FIG. 8. Referring to FIG. 8, an amount of water-soluble bases was low before storage, but substantial amounts of water-soluble bases, primarily comprising $Li_2CO_3$, were continuously formed upon exposure to air. Therefore, even when an initial amount of $Li_2CO_3$ impurities was low, it was revealed that the commercially available high-nickel $LiNiO_2$ is not stable in air and therefore rapidly decomposes at a substantial rate, and substantial amounts of $Li_2CO_3$ impurities are formed during storage.

Example 2

Figure 9:
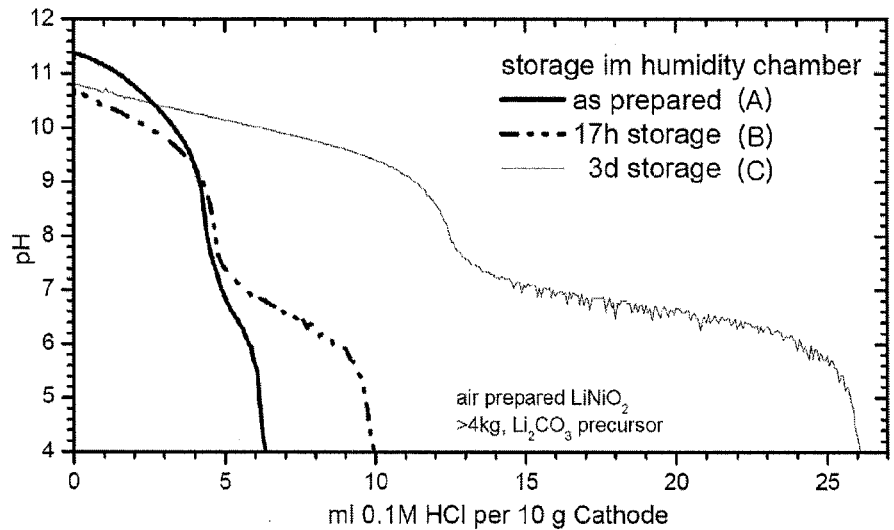
FIG. 9 is a graph showing a pH titration curve of a sample according to Example 2 during storage of the sample in a wet chamber. A: Sample as received, B: After storage of a sample for 17 hrs, and C: After storage of a sample for 3 days.

The pH titration was carried out for a sample of the lithium mixed transition metal oxide in accordance with Example 2 prior to exposure to moisture, and samples stored in a wet chamber (90% RH) at 60° C. in air for 17 hours and 3 days, respectively. The results thus obtained are given in FIG. 9.

Upon comparing the lithium mixed transition metal oxide of Example 2 (see FIG. 9) with the sample of Comparative Example 3 (see FIG. 8), the sample of Comparative Example 3 (stored for 17 hours) exhibited consumption of about 20 mL of HCl, whereas the sample of Example 2 (stored for 17 hours) exhibited consumption of 10 mL of HCl, thus showing an about two-fold decrease in production of the water-soluble bases. Further, in 3-day-storage samples, the sample of Comparative Example 3 exhibited consumption of about 110 mL of HCl, whereas the sample of Example 2 exhibited consumption of 26 mL of HCl, which corresponds to an about five-fold decrease in production of the water-soluble bases. Therefore, it can be seen that the sample of Example 2 decomposed at a rate about five-fold slower than that of the sample of Comparative Example 3. Then, it can be shown that the lithium mixed transition metal oxide of Example 2 exhibits superior chemical resistance even when it is exposed to air and moisture.

Comparative Example 4

A high-nickel $LiNiO_2$ sample having a composition of $LiNi_{0.8}Mn_{0.05}Co_{0.15}O_2$, as a commercial sample which was surface-coated with $AlPO_4$ followed by gentle heat treatment, was subjected to pH titration before and after storage in a wet chamber. As a result of pH titration, 12 mL of 0.1M HCl was consumed per 10 g cathode, an initial content of $Li_2CO_3$ was low, and the content of $Li_2CO_3$ after storage was slightly lower (80 to 90%) as compared to the sample of Comparative Example 3, but the content of $Li_2CO_3$ was higher than that of Example 2. Consequently, it was found that the aforementioned high-Ni $LiNiO_2$ shows no improvements in the stability against exposure to the air even when it was surface-coated, and also exhibits insignificant improvements in the electrochemical properties such as the cycle stability and rate characteristics.

Example 3

Samples with different Li:M molar ratios were prepared from MOOH (M=$Ni_{4/15}(Mn_{1/2}Ni_{1/2})_{8/15}Co_{0.2}$). $Li_2CO_3$ was used as a lithium source. Specifically, 7 samples each of about 50 g with Li:M ratios ranging from 0.925 to 1.12 were prepared by a sintering process in air at a temperature of 910 to 920° C. Then, electrochemical properties were tested.

Figure 10:
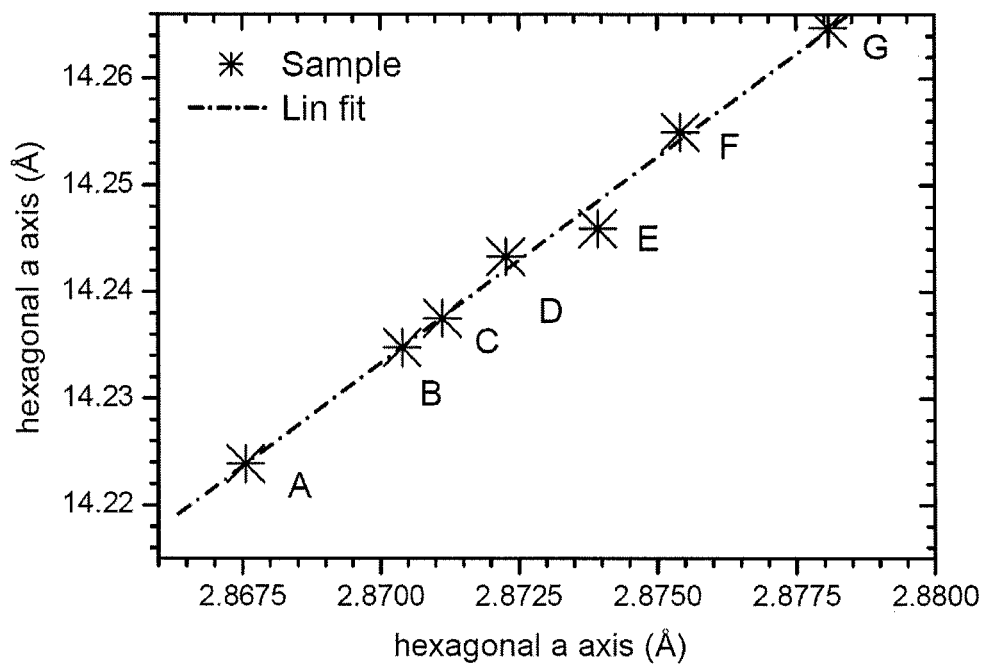
FIG. 10 is a graph showing lengths of a-axis and c-axis of crystallographic unit cells of samples having different ratios of Li:M in Experimental Example 3.

Table 3 below provides the obtained crystallographic data. The unit cell volume changes smoothly according to the Li:M ratio. FIG. 10 shows its crystallographic map. All samples are located on a straight line. According to the results of pH titration, the content of soluble base slightly increased with an increase of the Li:M ratio, but the total amount thereof was small. Accordingly, the soluble base probably originates from the surface basicity (i.e., is present by an ion exchange mechanism) but not from the dissolution of $Li_2CO_3$ impurities as observed in Comparative Example 1.

Therefore, this experiment clearly shows that the lithium mixed transition metal oxide prepared by the method in accordance with the present invention is in the Li stoichiometric range and additional Li is inserted into the crystal structure. In addition, it can be seen that stoichiometric samples without $Li_2CO_3$ impurity can be obtained even when $Li_2CO_3$ is used as a precursor and the sintering is carried out in air.

That is, as the Li/M molar ratio decreases, the amount of $Ni^{2+}$ ions inserted into the reversible lithium layer gradually increases. Insertion of excessively large amounts of $Ni^{2+}$ into the reversible lithium layer hinders the movement of $L^+$ during the charge/discharge process, thereby resulting in decreased capacity or poor rate characteristics. On the other hand, if the Li/M molar ratio is excessively high, the amount of $Ni^{2+}$ inserted into the reversible lithium layer is too low, which may result in structural instability leading to deterioration of the battery safety and lifespan characteristics. Further, at the high Li/M value, amounts of unreacted $Li_2CO_3$ increase to thereby result in a high pH-titration value. Therefore, upon considering the performance and safety of the battery, the molar ratio of Li:M is specifically from 0.95 to 1.04 (Samples B, C and D) to ensure that the value of $Ni^{2+}$ inserted into the lithium layer is from 3 to 7%.

TABLE 3

| Samples | A | B | C | D | E | F | G |
| --- | --- | --- | --- | --- | --- | --- | --- |
| Li:M ratio (molar) | 0.925 | 0.975 | 1.0 | 1.025 | 1.05 | 1.075 | 1.125 |
| Unit cell vol. | 34.111 Å$^3$ | 34.023 Å$^3$ | 33.923 Å$^3$ | 33.921 Å$^3$ | 33.882 Å$^3$ | 33.857 Å$^3$ | 33.764 Å$^3$ |
| c:a ratio | 1.0116 | 1.0117 | 1.0119 | 1.0122 | 1.0122 | 1.0123 | 1.0125 |
| Cation mixing | 8.8% | 6.6% | 4.7% | 4.0% | 2.1% | 2.5% | 1.4% |
| pH | 3 | 3.5 | 5 | 9 | 15 | 19 | 25 |

Example 4

$Li_2CO_3$ and a mixed oxyhydroxide of Formula MOOH (M=$Ni_{4/15}(Mn_{1/2}Ni_{1/2})_{8/15}Co_{0.2}$) were introduced into a furnace with an about 20 L chamber and sintered at 920° C. for 10 hours, during which more than 10 m$^3$ of air was pumped into the furnace, thereby preparing about 5 kg of $LiNiMO_2$ in one batch.

Figure 11:
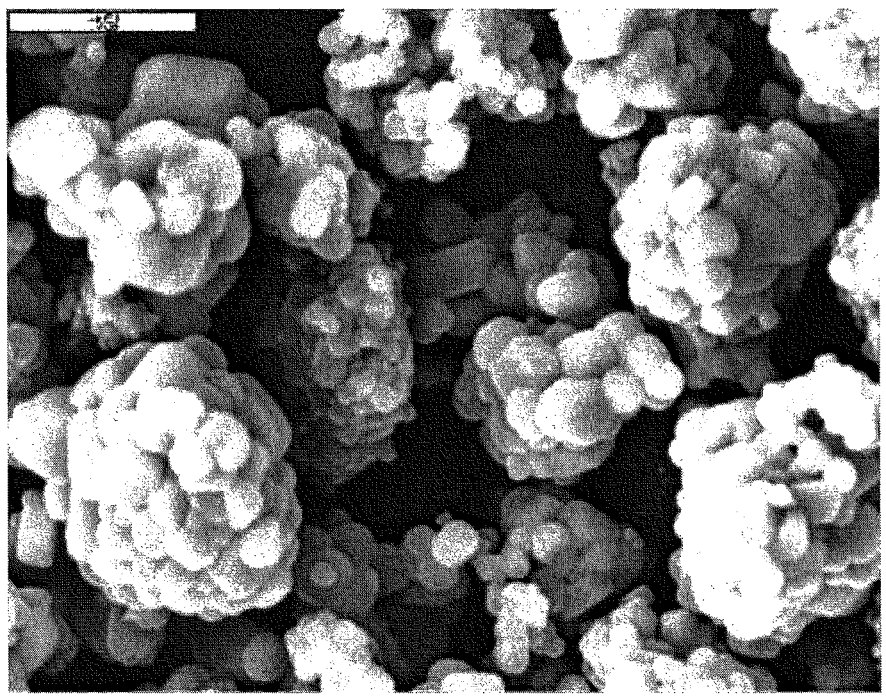
FIG. 11 is an SEM image of a sample according to Example 4.
Figure 12:
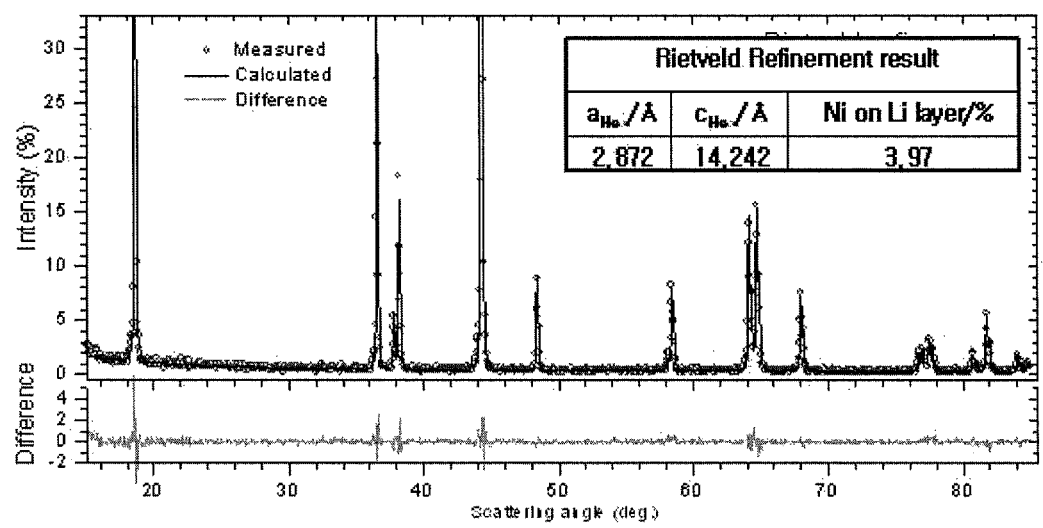
FIG. 12 shows the Rietveld refinement on X-ray diffraction patterns of a sample according to Example 4.

After sintering was complete, a unit cell constant was determined by X-ray analysis, and a unit cell volume was compared with a target value (Sample B of Example 1: 33.921 Å$^3$). ICP analysis found that the molar ratio of Li and M is very close to 1.00, and the unit cell volume was within the target range. FIG. 11 shows an scanning electron microscope (SEM) image of the thus-prepared cathode active material and FIG. 12 shows results of Rietveld refinement. Referring to these drawings, it can be seen that the sample exhibits high crystallinity and well-layered structure, a mole percentage of $Ni^{2+}$ ions inserted into a reversible lithium layer is 3.97%, and the calculated value and the measured value of the mole percentage of $Ni^{2+}$ ions is approximately the same.

Meanwhile, upon performing pH titration, less than 10 mL of 0.1M HCl was consumed to titrate 10 g of a cathode to achieve a pH of less than 5, which corresponds to a $Li_2CO_3$ impurity content of less than about 0.035 wt %. Hence, these results show that it is possible to achieve mass production of substantially $Li_2CO_3$-free $LiNiMO_2$ having a stable crystal structure from the mixed oxyhydroxide and $Li_2CO_3$ by a solid-state reaction.

Example 5

Figure 13:
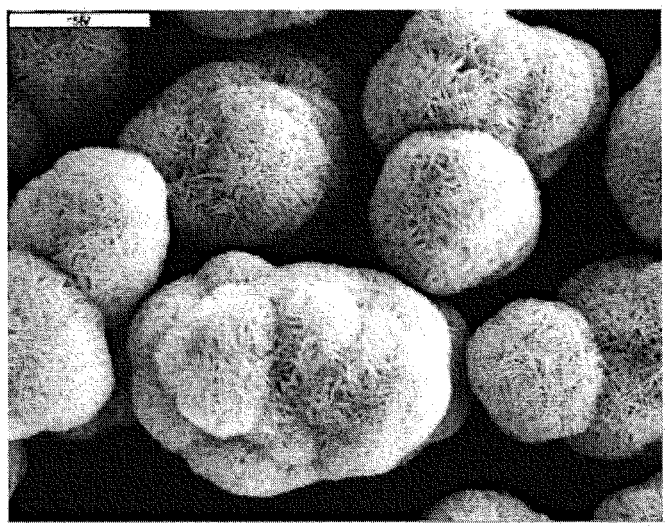
FIG. 13 is an SEM image (×5000) of a precursor in Example 5, which is prepared by an inexpensive ammonia-free process and has a low density.

More than 1 kg of MOOH (M=$Ni_{4/15}(Mn_{1/2} Ni_{1/2})_{8/15}Co_{0.2}$) was prepared by ammonia-free coprecipitation of $MSO_4$ and NaOH at 80° C. under the pH-adjustment condition. FIG. 13 shows an SEM micrograph of the thus-prepared precursor hydroxide. The aforementioned MOOH exhibited a narrow particle diameter distribution, and a tap density of about 1.2 g/cm³. A lithium mixed transition metal oxide was prepared using MOOH as a precursor. Sintering was carried out at 930° C. The lithium mixed transition metal oxide prepared using such a precursor did not exhibit the disintegration of particles as shown in Comparative Example 2. Therefore, from the excellent sintering stability of $LiMO_2$, it can be seen that $LiMO_2$ can be prepared from the mixed oxyhydroxide having a low tap density.

Experimental Example 1

Test of Electrochemical Properties

Coin cells were fabricated using the lithium mixed transition metal oxide of Examples 3 and 5, and $LiNiMO_2$ of Comparative Examples 2 to 4 (M=$(Ni_{1/2}Mn_{1/2})_{1-x}Co_x$ and x=0.17 (Comparative Example 5) and x=0.33 (Comparative Example 6), respectively, as a cathode, and a lithium metal as an anode. Electrochemical properties of the thus-fabricated coin cells were tested. Cycling was carried out primarily at 25° C. and 60° C., a charge rate of C/5 and a discharge rate of C/5 (1 C=150 mA/g) from 3 to 4.3 V.

Experimental results of the electrochemical properties for the coin cells of Comparative Examples 2 to 4 are given in Table 4 below. Referring to Table 4, the cycle stability was poor with the exception of Comparative Example 3 (Sample B). It is believed that Comparative Example 4 (Sample C) exhibits the poor cycle stability due to the lithium-deficiency of the surface. Whereas, even though Comparative Example 2 (Sample A) and Comparative Example 3 (Sample B) were not lithium-deficient, only Comparative Example 3 (Sample B) exhibited a low content of $Li_2CO_3$. The presence of such $Li_2CO_3$ may lead to gas evolution and gradual degradation of the performance (at 4.3 V, $Li_2CO_3$ slowly decomposes with the collapse of crystals). That is, there are no nickel-based active materials meeting both the excellent cycle stability and the low-impurity content, and therefore it can be shown that no commercial product is available in which the nickel-based active material has excellent cycle stability and high stability against exposure to air, in conjunction with a low level of $Li_2CO_3$ impurities and low production costs.

TABLE 4

| Substrate | Sample (A) $LiNi_{0.8}Co_{0.2}O_2$ Comp. Ex. 2 | Sample (B) Al/Ba-modified Comp. Ex. 3 | Sample (C) $AlPO_4$-coated Comp. Ex. 4 |
| --- | --- | --- | --- |
| Stoichiometric Li:M | Stoichiometric | Stoichiometric | Li-deficient at surfaces |
| $Li_2CO_3$ impurities | High | High | Low |
| Capacity at 25° C. C/10, C/1 | 193, 175 mAh/g | 195, 175 mAh/g | 185, 155 mAh/g |
| Capacity loss | 30% per 100 cycles | 11% per 100 cycles | >30% per 100 cycles |

On the other hand, the cells of Comparative Examples 5 and 6 exhibited a crystallographic density of 4.7 and 4.76 g/cm³, respectively, which were almost the same, and showed a discharge capacity of 157 to 159 mAh/g at a C/10 rate (3 to 4.3 V). Upon comparing with $LiCoO_2$ having a crystallographic density of 5.04 g/cm³ and a discharge capacity of 157 mAh/g, a volume capacity of the cell of Comparative Example 5 is equal to a 93% level of $LiCoO_2$, and the cell of Comparative Example 6 exhibits a crystallographic density corresponding to a 94% level of $LiCoO_2$. Therefore, it can be seen that a low content of Ni results in a poor volume capacity.

Figure 14:
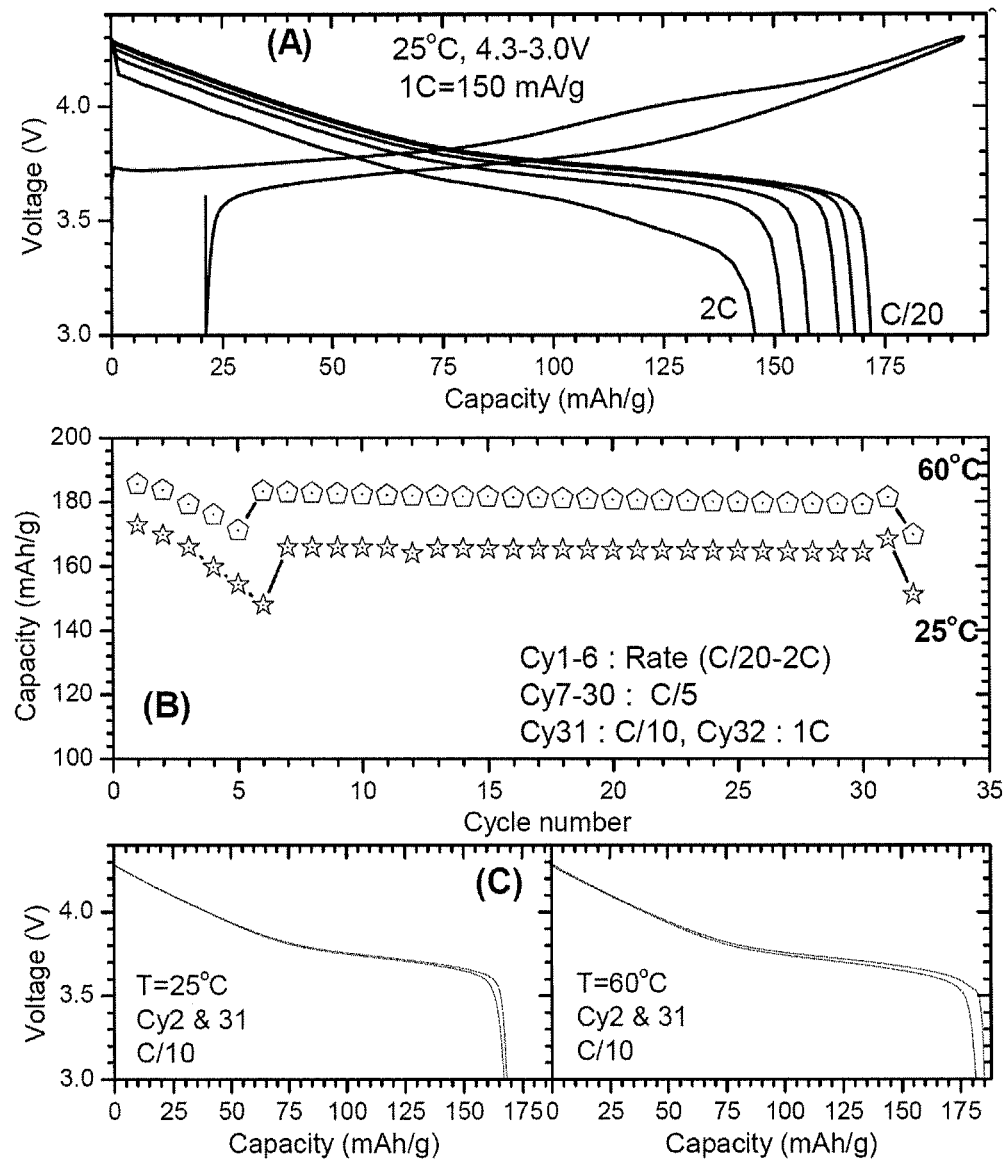
FIG. 14 is a graph showing electrochemical properties of LiNiMO$_2$ according to the present invention in Experimental Example 1. 14A: Graph showing voltage profiles and rate characteristics at room temperature (1 to 7 cycles); 14B: Graph showing cycle stability at 25° C. and 60° C. and a rate of C/5 (3.0 to 4.3V); and 14C: Graph showing discharge profiles (at C/10 rate) for Cycle 2 and Cycle 31, obtained during cycling at 25 t and 60° C.

Table 5 below summarizes electrochemical results of coin cells using $LiNiMO_2$ in accordance with Example 3 as a cathode, and FIG. 14 depicts voltage profiles, discharge curves and cycle stability. A crystallographic density of $LiNiMO_2$ in accordance with Example 3 was 4.74 g/cm³ (cf. $LiCoO_2$: 5.05 g/cm³). A discharge capacity was more than 170 mAh/g (cf. $LiCoO_2$: 157 mAh/g) at C/20, thus representing that the volume capacity of $LiNiMO_2$ was much improved as compared to $LiCoO_2$. Electrochemical properties of $LiNiMO_2$ in accordance with Example 5 were similar to those of Example 3.

TABLE 5

| Capacity retention after 100 cycles (extrapolated) C/5-C/5 cycle, 3.0-4.3 V | | Primary charge capacity 3.0-4.3 V, C/10 | Discharge capacity | | |
| --- | --- | --- | --- | --- | --- |
| 25° C. | 60° C. | | 25° C., C/1 | 25° C., C/20 | 60° C., C/20 |
| >96% | >90% | >190 mAh/g | 152 mA/g | 173 mAh/g | 185 mAh/g |

Experimental Example 2

Determination of Thermal Stability

Figure 15:
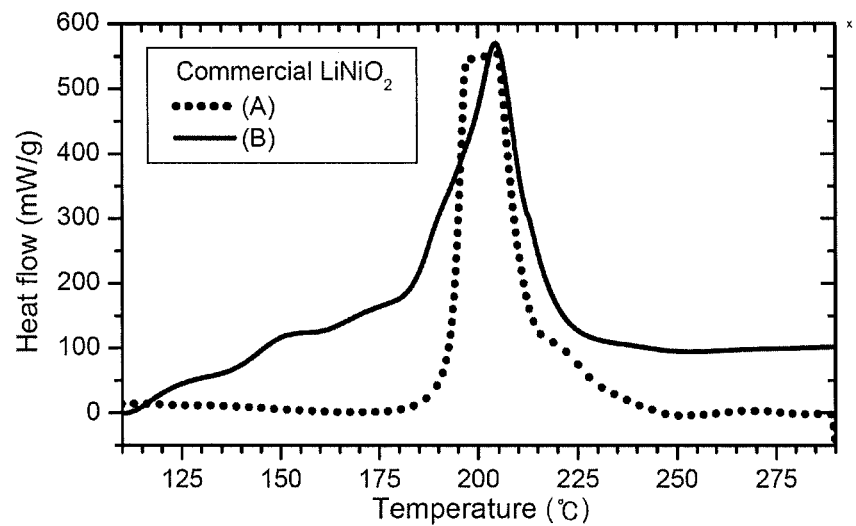
FIG. 15 is a graph showing DSC (differential scanning calorimetry) values for samples of Comparative Examples 3 and 4 in Experimental Example 2. A: Commercial Al/Ba-modified LiNiO$_2$ of Comparative Example 3, and B: Commercial AlPO$_4$-coated LiNiO$_2$ of Comparative Example 4.

In order to examine the thermal stability for the lithium mixed transition metal oxide of Example 3 and $LiNiMO_2$ in accordance with Comparative Examples 3 and 4, DSC analysis was carried out. The thus-obtained results are given in FIGS. 15 and 16. For this purpose, coin cells (anode: lithium metal) were charged to 4.3 V, disassembled, and inserted into hermetically sealed DSC cans, followed by injection of an electrolyte. A total weight of the cathode was from about 50 to about 60 mg, A total weight of the electrolyte was approximately the same. Therefore, an exothermic reaction is strongly cathode-limited. The DSC measurement was carried out at a heating rate of 0.5 K/min.

As a result, Comparative Example 3 (Al/Ba-modified $LiNiO_2$) and Comparative Example 4 ($AlPO_4$-coated $LiNiO_2$) showed the initiation of a strong exothermic reaction at a relatively low temperature. Particularly, Comparative Example 3 exhibited a heat evolution that exceeds the limit of the device. The total accumulation of heat generation was large, i.e. well above 2,000 kJ/g, thus indicating a low thermal stability (see FIG. 15).

Figure 16:
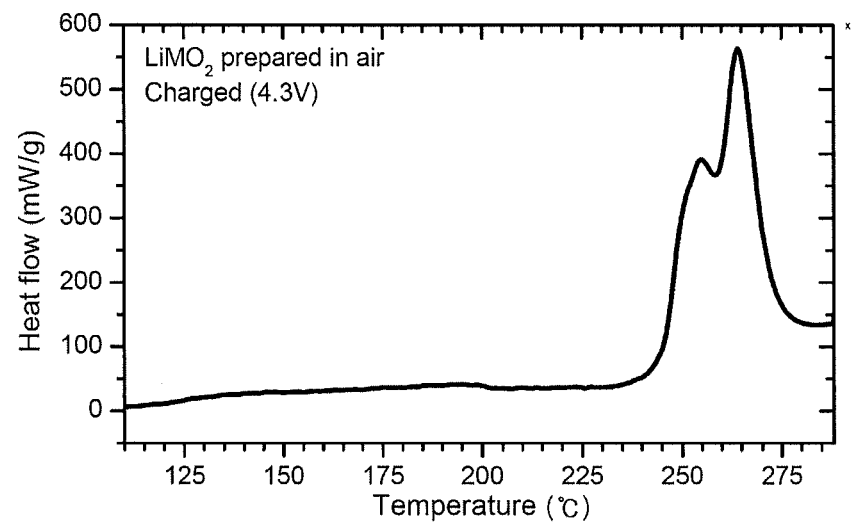
FIG. 16 is a graph showing DSC values for LiNiMO$_2$ according to Example 3 in Experimental Example 2.

Meanwhile, $LiNiMO_2$ of Example 3 in accordance with the present invention exhibited a low total heat evolution, and the initiation of an exothermic reaction at a relatively high temperature as compared to Comparative Examples 3 and 4 (see FIG. 16). Therefore, it can be seen that the thermal stability of $LiNiMO_2$ in accordance with the present invention is excellent.

Experimental Example 3

Test of Electrochemical Properties of Polymer Cells with Application of Lithium Mixed Transition Metal Oxide Using the lithium mixed transition metal oxide of Example 3 as a cathode active material, a pilot plant polymer cell of 383562 type was fabricated. For this purpose, the cathode was mixed with 17% by weight $LiCoO_2$, and the cathode slurry was an NMP/PVDF-based slurry. No additives for the purpose of preventing gelation were added. The anode was a mesocarbon microbead (MCMB) anode. The electrolyte was a standard commercial electrolyte free of additives known to reduce excessive swelling. Experiments were carried out at 60° C. and charge and discharge rates of C/5. A charge voltage was from 3.0 to 4.3 V.

Figure 17:
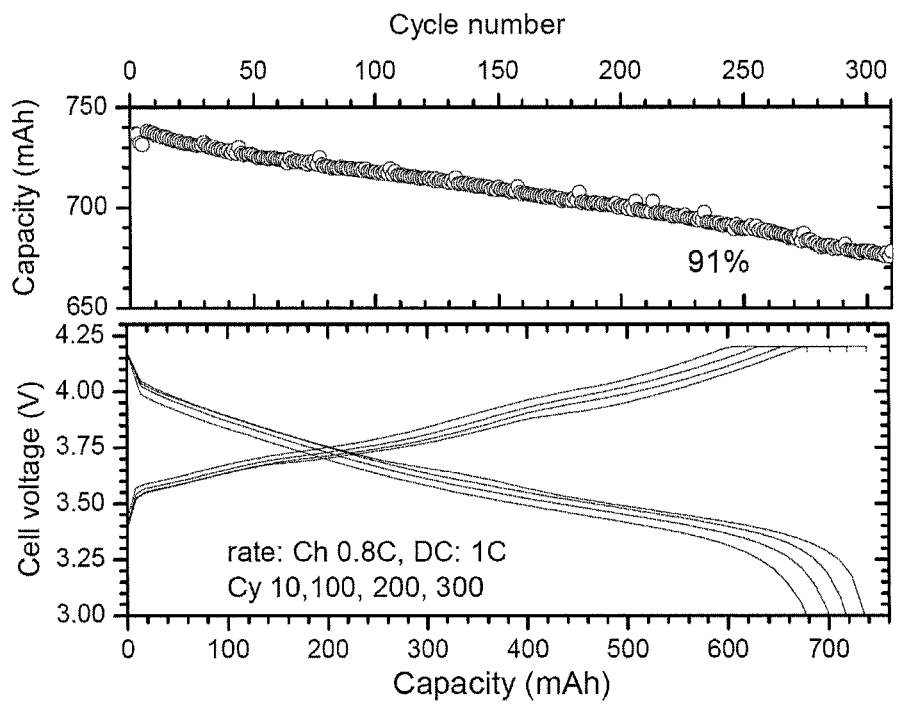
FIG. 17 is a graph showing electrophysical properties of a polymer cell according to one embodiment in Experimental Example 3.
Figure 18:
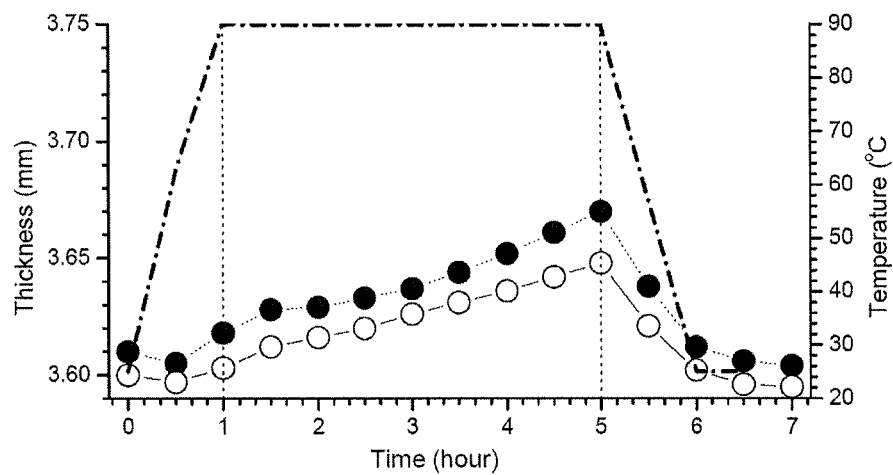
FIG. 18 is a graph showing swelling of a polymer cell during high-temperature storage in Experimental Example 3.

FIG. 17 shows the cycle stability of the battery of the present invention (0.8 C charge, 1 C discharge, 3 to 4 V, 2 V) at 25° C. An exceptional cycle stability (91% at C/1 rate after 300 cycles) was achieved at room temperature. The impedance build up was low. Also, the gas evolution during storage was measured. The results thus obtained are given in FIG. 18. During a 4 h-90° C. fully charged (4.2 V) storage, a very small amount of gas was evolved and only a small increase of thickness was observed. The increase of thickness was within or less than the value expected for good $LiCoO_2$ cathodes tested in similar cells under similar conditions. Therefore, it can be seen that $LiNiMO_2$ prepared by the method in accordance with the present invention exhibits very high stability and chemical resistance.

Example 6

A mixed hydroxide of Formula MOOH (M=$Ni_{4/15}(Mn_{1/2}Ni_{1/2})_{8/15}Co_{0.2}$) as a mixed transition metal precursor and $Li_2CO_3$ were mixed in a molar ratio of Li:M=1.01:1, and the mixture was sintered in air at 900° C. for 10 hours, thereby preparing 50 g of a lithium mixed transition metal oxide having a composition of $LiNi_{0.53}Co_{0.2}Mn_{0.27}O_2$.

X-ray analysis was carried out to obtain detailed lattice parameters with high resolution. Cation mixing was observed by Rietveld refinement. The results thus obtained are given in Table 6 below.

Comparative Example 7

A lithium mixed transition metal oxide was prepared in the same manner as in Example 6, except that a molar ratio of Li:M was set to 1:1 and sintering was carried out under an $O_2$ atmosphere. Then, X-ray analysis was carried out and the cation mixing was observed. The results thus obtained are given in Table 6 below.

TABLE 6

|  | Ex. 4 | Comp. Ex. 7 |
| --- | --- | --- |
| Li:M | 1.01:1 | 1:1 |
| Unit cell vol. (Å³) | 33.921 | 33.798 |
| Normalized c:a ratio c:a/24^0.5 | 1.0122 | 1.0124 |
| Cation mixing | 4.6% | 1.5% |

As can be seen from Table 6, the lithium mixed transition metal oxide of Example 6 in accordance with the present invention exhibited a larger unit cell volume and a smaller c:a ratio, as compared to that of Comparative Example 7. Therefore, it can be seen that the lithium mixed transition metal oxide of Comparative Example 7 exhibited an excessively low cation mixing ratio due to the heat treatment under the oxygen atmosphere. This case suffers from deterioration of the structural stability. That is, it can be seen that the heat treatment under the oxygen atmosphere resulted in the development of a layered structure due to excessively low cation mixing, but migration of $Ni^{2+}$ ions was hindered to an extent that the cycle stability of the battery is arrested.

Example 7

A lithium mixed transition metal oxide having a composition of $LiNi_{0.4}Co_{0.3}Mn_{0.3}O_2$ was prepared in the same manner as in Example 6, except that a mixed hydroxide of Formula MOOH (M=$Ni_{1/10}(Mn_{1/2}Ni_{1/2})_{6/10}Co_{0.3}$) was used as a mixed transition metal precursor, and the mixed hydroxide and $Li_2CO_3$ were mixed in a molar ratio of Li:M=1:1. The cation mixing was observed by X-ray analysis and Rietveld refinement. The results thus obtained are given in Table 7 below.

TABLE 7

| Li:M | 1:1 |
| --- | --- |
| Unit cell vol. | 33.895 Å³ |
| Normalized c:a ratio c:a/24^0.5 | 1.0123 |
| Cation mixing | 3% |
| Capacity (mAh/g) | 155 |

Example 8

A lithium mixed transition metal oxide having a composition of $LiNi_{0.65}Co_{0.2}Mn_{0.15}O_2$ was prepared in the same manner as in Example 6, except that a mixed hydroxide of Formula MOOH (M=$Ni_{5/10}(Mn_{1/2}Ni_{1/2})_{3/10}Co_{0.2}$) was used as a mixed transition metal precursor, and the mixed hydroxide and $Li_2CO_3$ were mixed in a molar ratio of Li:M=1:1.

The cation mixing was observed by X-ray analysis and Rietveld refinement. The results thus obtained are given in Table 8 below.

TABLE 8

| Li:M | 1:1 |
|---|---|
| Unit cell vol. | 34.025 Å³ |
| Normalized c:a ratio | 1.0107 |
| c:a/24^0.5 | |
| Cation mixing | 7% |
| Capacity (mAh/g) | 172 |

From the results shown in Tables 7 and 8, it can be seen that the lithium mixed transition metal oxide in accordance with the present invention provides desired effects, as discussed hereinbefore, in a given range.

INDUSTRIAL APPLICABILITY

As apparent from the above description, a cathode active material in accordance with the present invention comprises a lithium mixed transition metal oxide having a given composition, prepared by a solid-state reaction of $Li_2CO_3$ with a mixed transition metal precursor under an oxygen-deficient atmosphere, and has a $Li_2CO_3$ content of less than 0.07% by weight of the cathode active material as determined by pH titration. Therefore, the thus-prepared cathode active material exhibits excellent high-temperature stability and stable crystal structure, thereby providing a high capacity and excellent cycle stability, and also can be produced by an environmentally friendly method with low production costs and high production efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cathode active material comprising a lithium mixed transition metal oxide having a composition represented by Formula I:

$$Li_xM_yO_2 \quad (I)$$

wherein:
M=$M'_{1-k}A_k$, wherein M' is $Ni_{1-a-b}(Ni_{1/2}Mn_{1/2})_aCo_b$, 0.65≤a+b≤0.85 and 0.1≤b≤0.4;
A is a dopant;
0≤k<0.05; and
x+y=2 and 0.95≤x≤1.05,
wherein the lithium mixed transition metal oxide has a $Li_2CO_3$ impurity content of about 0.2% by weight or less of the cathode active material as determined by pH titration, and is prepared by a solid-state reaction of $Li_2CO_3$ and a mixed transition metal precursor under an oxygen-deficient atmosphere, wherein a mixing ratio of the $Li_2CO_3$ and the mixed transition metal precursor for the solid-state reaction is from 0.95 to 1.04:1, wherein the ratio of $Li_2CO_3$:mixed transition metal precursor is a w/w ratio.

2. The cathode active material according to claim 1, wherein $Li_2CO_3$ is contained in an amount such that less than 20 mL of a 0.1M HCl titrant solution is added during pH titration of a solution of water-soluble bases extracted from the cathode active material to reach a pH value of less than 5, wherein the solution of water-soluble bases is prepared by repeatedly soaking and decanting 10 g of the cathode active material with water such that the resulting solution contains substantially all of the water-soluble bases in the cathode active material, and wherein the total volume of solution of water-soluble base is 200 mL.

3. The cathode active material according to claim 2, wherein the amount of the 0.1M HCl solution added during pH titration to reach the pH of less than 5 is less than 10 mL.

4. The cathode active material according to claim 1, wherein the oxygen-deficient atmosphere has an oxygen concentration of 10 to 50% by volume.

5. The cathode active material according to claim 4, wherein the oxygen concentration is from 10% to 30% by volume.

6. The cathode active material according to claim 4, wherein the oxygen-deficient atmosphere is an air atmosphere.

7. The cathode active material according to claim 1, wherein the mixed transition metal precursor is one or more selected from the group consisting of $M(OH)_2$ and MOOH.

8. The cathode active material according to claim 7, wherein the mixed transition metal precursor is MOOH, and is prepared by an ammonia-free process.

9. The cathode active material according to claim 1, wherein the mixed transition metal precursor has a tap density of 1.1 to 1.6 g/cm³.

10. The cathode active material according to claim 1, wherein the solid-state reaction includes a sintering process at 600 to 1100° C. for 3 to 20 hours.

11. The cathode active material according to claim 10, wherein an amount of air exceeding 2 m³/kg $LiMO_2$ during the sintering process is supplied to a reaction vessel equipped with a heat exchanger for pre-warming of the air.

12. The cathode active material according to claim 1, wherein the lithium mixed transition metal oxide is prepared by a large-scale process under a high rate of air circulation.

13. The cathode active material according to claim 12, wherein at least 2 m³ of air at room temperature per 1 kg of the final lithium mixed transition metal oxide is pumped into or out of a reaction vessel.

14. The cathode active material according to claim 13, wherein at least 10 m³ of air at room temperature per 1 kg of the lithium mixed transition metal oxide is pumped into or out of the reaction vessel.

15. The cathode active material according to claim 11, wherein the heat exchanger pre-warms in-flowing air before the in-flowing air enters the reaction vessel, while cooling out-flowing air.

16. A lithium secondary battery comprising the cathode active material of claim 1.

17. The cathode active material according to claim 1, wherein the lithium mixed transitional metal oxide comprises mixed transition metal oxide (MO) layers comprising Ni ions, and reversible lithium layers which allow intercalation and deintercalation of lithium ions, wherein the MO layers and the reversible lithium layers are disposed alternately and repeatedly to form a layered crystal structure, and a portion of Ni ions derived from the MO layer is inserted into the reversible lithium layers at a level of 3 to 7% measured by Rietveld refinement of X-ray diffraction patterns to interconnect the MO layers and the reversible lithium layers.

18. A cathode active material comprising a lithium mixed transition metal oxide having a composition represented by Formula I:

$$Li_xM_yO_2 \quad (I)$$

wherein:

$M = M'_{1-k}A_k$, wherein M' is $Ni_{1-a-b}(Ni_{1/2}Mn_{1/2})_aCO_b$, $0.65 \leq a+b \leq 0.85$ and $0.1 \leq b \leq 0.4$;

A is a dopant;

$0 \leq k < 0.05$; and $x+y=2$ and $0.95 \leq x \leq 1.05$, wherein the lithium mixed transition metal oxide has a $Li_2CO_3$ impurity content of about 0.2% by weight or less of the cathode active material, the lithium mixed transition metal oxide being substantially free of soluble bases such that less than about 2.0 ml of 0.1M HCl is necessary to titrate 200 ml of a solution containing substantially all of the soluble bases present in 10 g of said lithium transition metal oxide to a pH less than 5, said solution being prepared by repeated soaking and decanting of the lithium mixed transition metal oxide.

19. The cathode active material according to claim 18, wherein less than about 10 ml of 0.1 M HCl is necessary to titrate 200 ml of a solution containing substantially all of the soluble bases present in 10 g of the lithium mixed transition metal oxide to a pH less than 5.

20. The cathode active material according to claim 18, wherein the lithium mixed transitional metal oxide comprises mixed transition metal oxide (MO) layers comprising Ni ions, and reversible lithium layers which allow intercalation and deintercalation of lithium ions, wherein the MO layers and the reversible lithium layers are disposed alternately and repeatedly to form a layered crystal structure, and a portion of Ni ions derived from the MO layer is inserted into the reversible lithium layers at a level of 3 to 7% measured by Rietveld refinement of X-ray diffraction patterns to interconnect the MO layers and the reversible lithium layers.

21. A lithium secondary battery comprising the cathode active material of claim 18.

\* \* \* \* \*